US009038445B2

(12) United States Patent
Ito et al.

(10) Patent No.: US 9,038,445 B2
(45) Date of Patent: May 26, 2015

(54) METHOD AND APPARATUS FOR DIAGNOSING ENGINE FAULT

(75) Inventors: Hiroshi Ito, Tokyo (JP); Takayuki Abe, Saitama (JP); Tetsuya Ohno, Tokyo (JP); Mahito Shikama, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/006,446

(22) PCT Filed: Feb. 24, 2012

(86) PCT No.: PCT/JP2012/054513
§ 371 (c)(1),
(2), (4) Date: Sep. 20, 2013

(87) PCT Pub. No.: WO2012/127976
PCT Pub. Date: Sep. 27, 2012

(65) Prior Publication Data
US 2014/0007664 A1 Jan. 9, 2014

(30) Foreign Application Priority Data

Mar. 24, 2011 (JP) .................................. 2011-065104
Mar. 24, 2011 (JP) .................................. 2011-065105

(51) Int. Cl.
*G01M 15/11* (2006.01)
*F02D 41/14* (2006.01)
(Continued)

(52) U.S. Cl.
CPC .......... *G01M 15/11* (2013.01); *F02D 41/1498* (2013.01); *F02D 41/22* (2013.01);
(Continued)

(58) Field of Classification Search
CPC ................ G01M 15/11; G01M 15/046; F02D 2200/1015; F02D 41/22; F02D 41/1498; F02D 41/123; F02D 13/06; F02D 17/02
USPC ........................................ 73/114.02, 114.04
See application file for complete search history.

(56) References Cited

U.S. PATENT DOCUMENTS 5,000,280 A * 3/1991 Wazaki et al. ................. 180/197
5,307,670 A * 5/1994 Imai et al. .................. 73/114.04
(Continued)

FOREIGN PATENT DOCUMENTS

| EP | 0 609 451 A1 | 8/1994 |
| EP | 1 881 186 A2 | 1/2008 |

(Continued)

OTHER PUBLICATIONS

International Search Report dated Mar. 27, 2012 corresponding to International Patent Application No. PCT/ JP2012/054513 and English translation thereof.
(Continued)

*Primary Examiner* — Freddie Kirkland, III
(74) *Attorney, Agent, or Firm* — Squire Patton Boggs (US) LLP

(57) ABSTRACT

According to a method and an apparatus of the present invention for diagnosing a fault of an engine, a cranking rotation state is created by rotating a crank shaft while explosions in each cylinder are stopped; a variation of angular velocity of the crank shaft is detected for each cylinder in the cranking rotation state; a cylinder the compression pressure of which is insufficient is detected based on the variation; and if a cylinder indicated as a misfiring cylinder by a fault code is the same as the cylinder detected as being insufficient in compression pressure in the cranking rotation state, the cylinder is specified.

20 Claims, 30 Drawing Sheets

(51) Int. Cl.
*F02D 41/22* (2006.01)
*F02D 41/12* (2006.01)
*G01M 15/04* (2006.01)

(52) U.S. Cl.
CPC ...... *F02D2200/1015* (2013.01); *F02D 41/123* (2013.01); *F02D 2200/021* (2013.01); *F02D 2200/023* (2013.01); *F02D 2200/503* (2013.01); *G01M 15/046* (2013.01)

(56) References Cited

U.S. PATENT DOCUMENTS

| | | | |
|---|---|---|---|
| 5,373,732 A | | 12/1994 | Kuroda et al. |
| 5,377,536 A | * | 1/1995 | Angermaier et al. ...... 73/114.03 |
| 5,426,587 A | * | 6/1995 | Imai et al. ...................... 701/111 |
| 5,734,100 A | * | 3/1998 | Kishimoto et al. ........ 73/114.03 |
| 5,862,505 A | * | 1/1999 | Fujiki ........................... 701/111 |
| 6,055,852 A | | 5/2000 | Wang et al. |
| 7,234,446 B2 | * | 6/2007 | Toyoda .................... 123/406.14 |
| 7,614,290 B2 | * | 11/2009 | Shikama et al. ........... 73/114.25 |
| 7,677,092 B2 | * | 3/2010 | Ishizuka et al. ............ 73/114.45 |
| 2006/0089782 A1 | | 4/2006 | Galtier et al. |
| 2007/0101806 A1 | * | 5/2007 | Yamaguchi .................. 73/117.3 |
| 2009/0088956 A1 | * | 4/2009 | Lin et al. ....................... 701/111 |
| 2014/0020655 A1 | * | 1/2014 | Ito et al. ..................... 123/339.1 |

FOREIGN PATENT DOCUMENTS

| | | |
|---|---|---|
| EP | 1 983 326 A1 | 10/2008 |
| EP | 2 184 476 A1 | 5/2010 |
| JP | 2001-152953 A | 6/2001 |
| JP | 2004-019465 A | 1/2004 |
| JP | 2005-264853 A | 9/2005 |
| JP | 2006-214361 A | 8/2006 |
| JP | 2009-222018 A | 10/2009 |
| JP | 2009-280082 A | 12/2009 |
| WO | WO 2004/046678 A1 | 6/2004 |

OTHER PUBLICATIONS

European Search Report dated Nov. 10, 2014 corresponding to European Patent Application No. 12761202.6.

* cited by examiner

FIG. 6
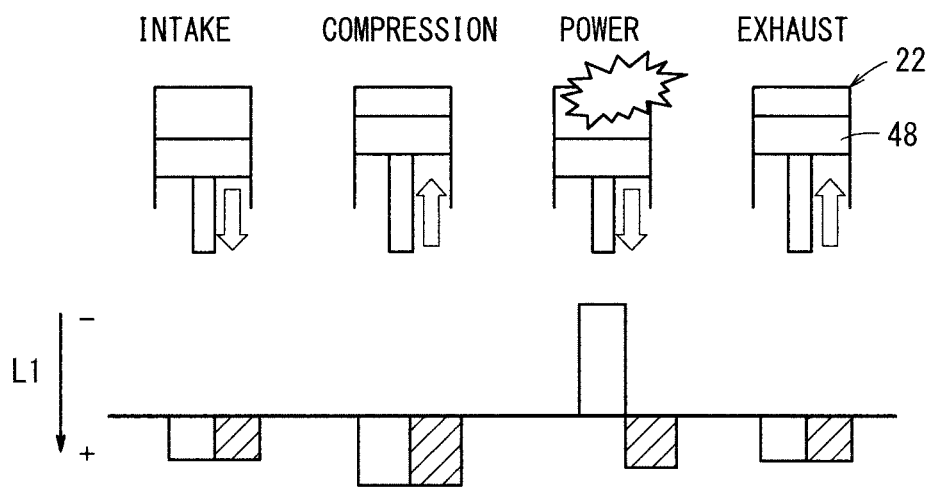
 WHEN CYLINDER OPERATES NORMALLY
 WHEN MISFIRE OCCURS FIG. 14
WHEN ENGINE IS CRANKED
INTAKE   COMPRESSION   POWER   EXHAUST
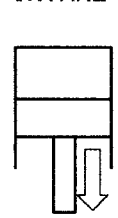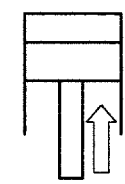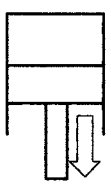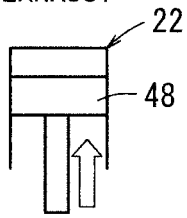
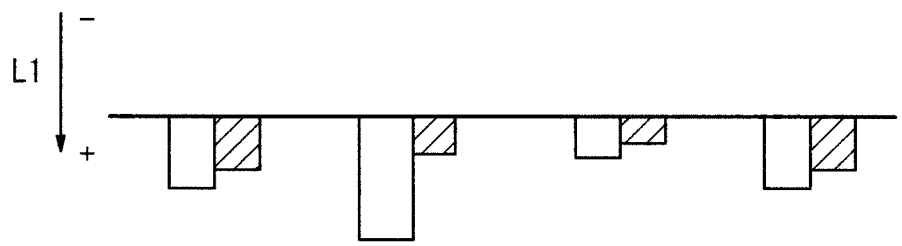
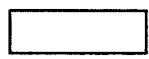 WHEN CYLINDER OPERATES NORMALLY
 WHEN MISFIRE OCCURS FIG. 23
| | Δω [rad/s] | AVEr [rad/s] | R1 (=AVEr/AVEt) [%] | RESULT OF JUDGMENT FROM DIAGNOSING APPARATUS |
|---|---|---|---|---|
| FIRST CYLINDER | 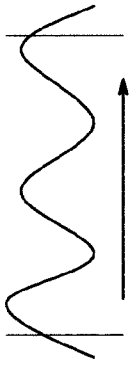 | 44.4 | 44.4/52.03 =85% | NO GOOD (NEEDS TO BE CHECKED FOR MECHANICAL FAULT) |
| SECOND CYLINDER | 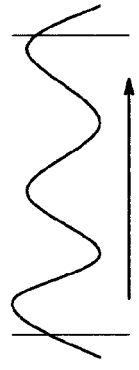 | 54.0 | 54.0/52.03 =104% | GOOD |
| THIRD CYLINDER | 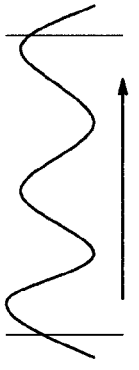 | 53.9 | 53.9/52.03 =104% | GOOD |
| FOURTH CYLINDER | 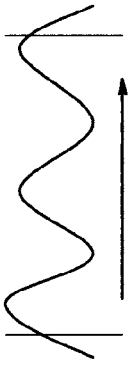 | 55.8 | 55.8/52.03 =107% | GOOD |
| | | AVEt =52.03 [rad/s] | | |

FIG. 25

| | DIAGNOSTIC TROUBLE CODE | R1 [%] | RESULT OF JUDGMENT FROM DIAGNOSING APPARATUS | INSPECTION ITEM, CONFIRMATION AREA OF ENGINE |
|---|---|---|---|---|
| | | | | TAPPET CLEARANCE FAILURE COMPRESSION FAILURE |
| FIRST CYLINDER | P0301 (STORED) | 88% | NO GOOD (NEEDS TO BE CHECKED FOR MECHANICAL FAULT) | |
| SECOND CYLINDER | NONE | 103% | GOOD (NO MECHANICAL FAULT) | — |
| THIRD CYLINDER | NONE | 105% | GOOD | — |
| FOURTH CYLINDER | NONE | 104% | GOOD | — |

FIG. 26

| DIAGNOSTIC TROUBLE CODE | | R1 [%] | RESULT OF JUDGMENT FROM DIAGNOSING APPARATUS | INSPECTION ITEM, CONFIRMATION AREA OF ENGINE |
|---|---|---|---|---|
| FIRST CYLINDER | P0301 (STORED) | 88% | NO GOOD (NEEDS TO BE CHECKED FOR MECHANICAL FAULT) | TAPPET CLEARANCE FAILURE COMPRESSION FAILURE |
| SECOND CYLINDER | NONE | 103% | GOOD (NO MECHANICAL FAULT) | — |
| THIRD CYLINDER | P0303 (STORED) | 105% | GOOD | — |
| FOURTH CYLINDER | NONE | 104% | GOOD | — |

FIG. 27

| | DIAGNOSTIC TROUBLE CODE | R1 [%] | RESULT OF JUDGMENT FROM DIAGNOSING APPARATUS | INSPECTION ITEM, CONFIRMATION AREA OF ENGINE |
|---|---|---|---|---|
| FIRST CYLINDER | NONE | 88% | GOOD (NO MECHANICAL FAULT) | — |
| SECOND CYLINDER | NONE | 103% | GOOD | — |
| THIRD CYLINDER | NONE | 105% | GOOD | — |
| FOURTH CYLINDER | NONE | 104% | GOOD | — |

FIG. 28

| | DIAGNOSTIC TROUBLE CODE | R1 [%] | RESULT OF JUDGMENT FROM DIAGNOSING APPARATUS | INSPECTION ITEM, CONFIRMATION AREA OF ENGINE |
|---|---|---|---|---|
| FIRST CYLINDER | P0301 (STORED) | 88% | NO GOOD (NEEDS TO BE CHECKED FOR MECHANICAL FAULT) | COMPRESSION FAILURE |
| SECOND CYLINDER | P0302 (STORED) | 94% | NO GOOD | LARGE TAPPET CLEARANCE DEVIATION |
| THIRD CYLINDER | P0303 (STORED) | 97% | NO GOOD | SMALL TAPPET CLEARANCE DEVIATION |
| FOURTH CYLINDER | NONE | 121% | GOOD (NO MECHANICAL FAULT) | — |

FIG. 29

| | DIAGNOSTIC TROUBLE CODE | R1 [%] | RESULT OF JUDGMENT FROM DIAGNOSING APPARATUS | INSPECTION ITEM, CONFIRMATION AREA OF ENGINE |
|---|---|---|---|---|
| FIRST CYLINDER | P0301 (STORED) | 88% | NO GOOD (NEEDS TO BE CHECKED FOR MECHANICAL FAULT) | COMPRESSION FAILURE |
| SECOND CYLINDER | NONE | 103% | GOOD (NO MECHANICAL FAULT) | — |
| THIRD CYLINDER | P0303 (STORED) | 97% | NO GOOD | TAPPET CLEARANCE FAILURE |
| FOURTH CYLINDER | NONE | 112% | GOOD | — |

FIG. 30

| DIAGNOSTIC TROUBLE CODE | | R1 [%] | RESULT OF JUDGMENT FROM DIAGNOSING APPARATUS | INSPECTION ITEM, CONFIRMATION AREA OF ENGINE |
|---|---|---|---|---|
| FIRST CYLINDER | NONE | 88% | GOOD (NO MECHANICAL FAULT) | — |
| SECOND CYLINDER | NONE | 94% | GOOD | — |
| THIRD CYLINDER | NONE | 97% | GOOD | — |
| FOURTH CYLINDER | P0304 (STORED) | 121% | GOOD | — |

METHOD AND APPARATUS FOR DIAGNOSING ENGINE FAULT

TECHNICAL FIELD

The present invention relates to a method of and an apparatus for diagnosing an engine for a fault, by identifying a misfiring engine cylinder and storing a diagnostic trouble code representative of the misfiring cylinder.

BACKGROUND ART

There is known a technology for detecting the occurrence of a misfire in each of cylinders of an engine. See, Japanese Laid-Open Patent Publication No. 2009-280082 (hereinafter referred to as "JP2009-280082A"). According to JP2009-280082A, when a management ECU (117) judges that a misfire has occurred in an internal combustion engine (107), the management ECU turns on a warning lamp (125) (see paragraph [0027]).

There also is known a technology for detecting an abnormal compression pressure in each of cylinders of an engine. See, Japanese Laid-Open Patent Publication No. 2004-019465 (hereinafter referred to as "JP2004-019465A"). According to JP2004-019465A, while a fuel system and an ignition system are inactivated, the engine is cranked in order to rotate a crankshaft (1a), and a rotational variation of the engine is detected using a difference between instantaneous rotational speeds at preset crankshaft angles in compression strokes of the cylinders. An abnormal compression pressure is detected based on the rotational variation (see claims 1 through 6).

SUMMARY OF INVENTION

Based on a warning, such as turning on of a warning lamp as disclosed in JP2009-280082A, the engine is diagnosed as suffering from a fault, and then the engine is inspected and repaired at a service shop. However, since there are many factors responsible for a misfire, a large amount of time and effort is required to identify the trouble spot.

For example, if a troubleshooting process, which is carried out at a time that a misfire occurs in a multi-cylinder engine, includes an inspection item for confirming whether or not a compression pressure in an engine is abnormal, then the troubleshooting process may include a process for directly measuring compression pressures in the engine cylinders as the engine is being cranked, with pressure gauges inserted respectively into ignition plug insertion holes from which the ignition plugs have been removed, as well as a process for inspecting all of the valve clearances, i.e., the clearances of intake valves and exhaust valves, in the cylinders. However, such mechanical inspecting processes require a large expenditure of man-hours for disassembling the engine and adjusting and servicing the engine.

Causes of misfires are generally classified into electrical causes and mechanical causes. In particular, mechanical causes are problematic in that the process of identifying mechanical causes is highly tedious and time-consuming, since the engine has to be disassembled and serviced.

According to the technology for detecting an abnormal compression pressure in each of the cylinders as disclosed in JP2004-019465A, even if the compression pressures in the cylinders are slightly different from each other, misfiring may not actually occur and the engine may operate normally without any trouble. The difference between instantaneous rotational speeds at the time that the engine is cranked tends to be affected by different frictional properties of cylinder components as well as compression pressures. Thus, it may not be easy to judge whether or not a detected compression pressure is abnormal and requires the engine to be repaired, based simply on the relative difference between instantaneous rotational speeds.

As described above, the process for detecting an abnormal compression pressure in each of the cylinders as disclosed in JP2004-019465A uses a difference between instantaneous rotational speeds at preset crankshaft angles in compression strokes of the cylinders. Consequently, in order to detect an abnormal compression pressure, there is a need for a new diagnostic arrangement (including software such as judgment logic software) for detecting the difference between instantaneous rotational speeds in compression strokes of the cylinders. As a result, the engine diagnosing system is inevitably complex and costly.

The present invention has been made in view of the aforementioned problems. It is an object of the present invention to provide a method of and an apparatus for diagnosing an engine for a fault in a reduced number of diagnostic man-hours, simply by judging whether or not a misfire has occurred due to a mechanical fault, and identifying which of the cylinders is suffering from mechanical trouble.

Another object of the present invention is to provide a method of and an apparatus for diagnosing an engine for faults with a simplified arrangement and in a reduced number of diagnostic man-hours, simply by judging whether or not a misfire has occurred due to mechanical trouble, and identifying which of the cylinders is suffering from mechanical trouble, through utilization of an arrangement and judgment logic for judging misfires, based on the recognition that the occurrence of a misfire during operation of the engine is judged based on a detected variation in angular velocity of the crankshaft during power strokes of the engine while in operation.

According to the present invention, there is provided a method of diagnosing an engine for a fault, which is monitored by a misfire monitor for judging a misfiring cylinder that suffers from a misfire while an engine having a plurality of cylinders is in operation, and storing a diagnostic trouble code representative of the misfiring cylinder, comprising cranking the engine to rotate a crankshaft while canceling fuel explosion in the cylinders, detecting variations in angular velocity of the crankshaft for each of the cylinders while the engine is being cranked, and determining a compression pressure shortage cylinder, which suffers from a shortage of compression pressure, based on the detected variations, and identifying one of the cylinders, which coincides with the misfiring cylinder represented by the diagnostic trouble code and the compression pressure shortage cylinder that is determined while the engine is being cranked.

According to the present invention, a cylinder is identified, which coincides with a misfiring cylinder indicated by a diagnostic trouble code and a compression pressure shortage cylinder that is determined while the engine is being cranked. The cylinder is thus identified as suffering from a shortage of compression pressure, which needs to be repaired. Consequently, it is possible to judge whether or not there is a shortage of compression pressure (a mechanical fault) responsible for a misfire, without the need for disassembling the misfiring cylinder, so that the efficiency with which the engine is diagnosed for a fault can be increased.

The method may further comprise detecting variations in angular velocity of the crankshaft in a power stroke of the engine for each of the cylinders while the engine is in normal operation, and determining one of the cylinders, which exhibits small variations in angular velocity, as the misfiring cylinder, and detecting variations in angular velocity of the crankshaft in a power stroke of the engine for each of the cylinders while the engine is being cranked, and determining one of the cylinders, which exhibits small variations in angular velocity, as the compression pressure shortage cylinder.

While the engine either is operating normally or is being cranked, variations in angular velocity of the crankshaft in the power stroke are detected, and a cylinder, which exhibits small variations in angular velocity, is judged as a misfiring cylinder or a compression pressure shortage cylinder. Accordingly, the logic of a vehicle ECU for judging misfiring can also be used as a logic for judging a compression pressure shortage cylinder. Consequently, an arrangement (including software such as judgment logic software) for detecting a compression pressure shortage cylinder can be simplified.

According to the present invention, there also is provided a method of diagnosing an engine for a fault, which is monitored by a misfire monitor for detecting variations in angular velocity of a crankshaft of an engine having a plurality of cylinders, in a power stroke of the engine for each of the cylinders, and judging a misfiring cylinder that suffers from a misfire based on the detected variations, comprising cranking the engine to rotate the crankshaft while canceling fuel explosion in the cylinders, detecting variations in angular velocity of the crankshaft in the power stroke for each of the cylinders while the engine is being cranked, and determining one of the cylinders, which exhibits variations in angular velocity that are equal to or smaller than a predetermined value, as a compression pressure shortage cylinder that suffers from a shortage of compression pressure.

While the engine is being cranked to rotate the crankshaft and while canceling fuel explosion in the cylinders, variations in angular velocity of the crankshaft are detected, thereby making it possible to judge the occurrence of an abnormal compression pressure in the cylinders. Therefore, it can be determined whether or not there is a shortage of compression pressure (mechanical fault) that is responsible for a misfire, without the need for disassembling the cylinders. Accordingly, the efficiency with which faults of the engine are diagnosed can be increased.

While the engine either is operating normally or is being cranked, variations in angular velocity of the crankshaft in the power stroke are detected, and a compression pressure shortage cylinder is determined based on the variations. Accordingly, the logic of a vehicle ECU, which is employed to judge misfiring, can also be used as a logic for judging the existence of a compression pressure shortage cylinder. Consequently, an arrangement (including software such as judgment logic software) for detecting the presence of a compression pressure shortage cylinder can be simplified.

The present invention can be used not only when there are misfiring cylinders, but also to confirm operation of the engine when the vehicle is checked and serviced after the engine has been assembled.

The method may further comprise, while the engine is being cranked, comparing individual average values, which represent average values of the individual variations of the cylinders, with a total average value, which represents an average value of the variations of the cylinders, and determining one of the cylinders, which exhibits a smaller individual average value than the total average value, as the compression pressure shortage cylinder. Therefore, the compression pressure shortage cylinder can be determined by a relative comparison of the cylinders. Even if a change in the voltage of a battery for energizing a starter motor that actuates the crankshaft, or a change in the ambient temperature, etc., affect variations in angular velocity of the crankshaft to a certain extent, such variations are less likely to affect the determination concerning the compression pressure shortage cylinder.

The method may further comprise displaying, in a plurality of stages, a degree of difference from the total average value, in connection with individual average values that are smaller than the total average value. If an individual average value is smaller than the total average value, then the degree of the difference of the individual average value from the total average value is representative of the magnitude of the shortage of compression pressure. The magnitude of the shortage of compression pressure depends on the cause thereof (e.g., a compression pressure leakage from the cylinders, a clearance of the intake valve or the exhaust valve). Therefore, the degree of the difference of an individual average value from the total average value can be used as a means for estimating the cause of the shortage of compression pressure. Thus, if the degree of the difference is displayed, it is possible for the operator to estimate the cause of the shortage of compression pressure. If the cause of the shortage of compression pressure is displayed as well as the degree of the difference, then diagnostic efficiency can be increased.

The variations in angular velocity of the crankshaft while the engine is being cranked may start being detected upon elapse of a predetermined time from the start of a motor that actuates the crankshaft. In this manner, since the variations in angular velocity are detected when cranking of the engine becomes stable, it is possible to determine the compression pressure shortage cylinder accurately.

The method may further comprise monitoring a voltage of a battery for energizing the motor that actuates the crankshaft, and stopping determination of a compression pressure shortage cylinder if the voltage of the battery drops from a predetermined voltage. Since the judgment is avoided when cranking of the engine becomes unstable due to a voltage drop of the battery, it is possible to avoid errors in determining the compression pressure shortage cylinder.

The method may further comprise stopping determination of a compression pressure shortage cylinder if an engine coolant temperature or an engine oil temperature is lower than a predetermined value. If the predetermined value is set to a value that is unlikely to occur in a normal environment during normal usage, then the determination of the compression pressure shortage cylinder in a peculiar environment of usage can be avoided, and thus, it is possible to avoid errors in determining the compression pressure shortage cylinder.

According to the present invention, there is provided an apparatus for diagnosing an engine for a fault, which is monitored by a misfire monitor for judging a misfiring cylinder that suffers from a misfire while an engine having a plurality of cylinders is in operation, and storing a diagnostic trouble code representative of the misfiring cylinder, wherein the apparatus cranks the engine to rotate a crankshaft while canceling fuel explosion in the cylinders, detects variations in angular velocity of the crankshaft for each of the cylinders while the engine is being cranked, and determines a compression pressure shortage cylinder, which suffers from a shortage of compression pressure, based on the detected variations, and the apparatus identifies one of the cylinders, which coincides with the misfiring cylinder represented by the diagnostic trouble code and the compression pressure shortage cylinder that is determined while the engine is being cranked.

According to the present invention, there is further provided an apparatus for diagnosing an engine for a fault, which is monitored by a misfire monitor for detecting variations in angular velocity of a crankshaft of an engine having a plurality of cylinders, in a power stroke of the engine for each of the cylinders, and judging a misfiring cylinder that suffers from a misfire based on the detected variations, wherein the apparatus cranks the engine to rotate the crankshaft while canceling fuel explosion in the cylinders, detects variations in angular velocity of the crankshaft in the power stroke for each of the cylinders while the engine is being cranked, and determines one of the cylinders, which exhibits variations in angular velocity that are equal to or smaller than a predetermined value, as a compression pressure shortage cylinder that suffers from a shortage of compression pressure.

BRIEF DESCRIPTION OF DRAWINGS

FIG. 6 is a diagram showing by way of example a relationship between strokes of a piston in each cylinder and the magnitude of a load applied to the crankshaft as the piston operates during normal operation of the engine, when the cylinder operates normally and the cylinder suffers from a misfire;

FIG. 14 is a diagram showing by way of example a relationship between strokes of a piston in each cylinder and magnitudes of loads applied to the crankshaft as the piston operates during cranking of the engine, when the cylinder operates normally and when the cylinder suffers from a shortage of compression pressure;

FIG. 23 is a diagram showing by way of example variations in angular velocity of the cylinders, individual average values, ratios of the individual average values to the total average value, and judgments made by the diagnosing apparatus;

FIG. 25 is a diagram showing a first example of a relationship between diagnostic trouble codes stored in the engine ECU, ratios calculated by the diagnosing apparatus, judgments made by the diagnosing apparatus, and inspection items and confirmation areas of the engine, which are displayed by the diagnosing apparatus based on the judgments;

FIG. 26 is a diagram showing a second example of a relationship between diagnostic trouble codes stored in the engine ECU, ratios calculated by the diagnosing apparatus, judgments made by the diagnosing apparatus, and inspection items and confirmation areas of the engine, which are displayed by the diagnosing apparatus based on the judgments;

FIG. 27 is a diagram showing a third example of a relationship between diagnostic trouble codes stored in the engine ECU, ratios calculated by the diagnosing apparatus, judgments made by the diagnosing apparatus, and inspection items and confirmation areas of the engine, which are displayed by the diagnosing apparatus based on the judgments;

FIG. 28 is a diagram showing a fourth example of a relationship between diagnostic trouble codes stored in the engine ECU, ratios calculated by the diagnosing apparatus, judgments made by the diagnosing apparatus, and inspection items and confirmation areas of the engine, which are displayed by the diagnosing apparatus based on the judgments;

FIG. 29 is a diagram showing a fifth example of a relationship between diagnostic trouble codes stored in the engine ECU, ratios calculated by the diagnosing apparatus, judgments made by the diagnosing apparatus, and inspection items and confirmation areas of the engine, which are displayed by the diagnosing apparatus based on the judgments; and FIG. 30 is a diagram showing a sixth example of a relationship between diagnostic trouble codes stored in the engine ECU, ratios calculated by the diagnosing apparatus, judgments made by the diagnosing apparatus, and inspection items and confirmation areas of the engine, which are displayed by the diagnosing apparatus based on the judgments.

DESCRIPTION OF EMBODIMENTS

A. Embodiment

1. Arrangement
(1) Overall Configuration

Figure 1:
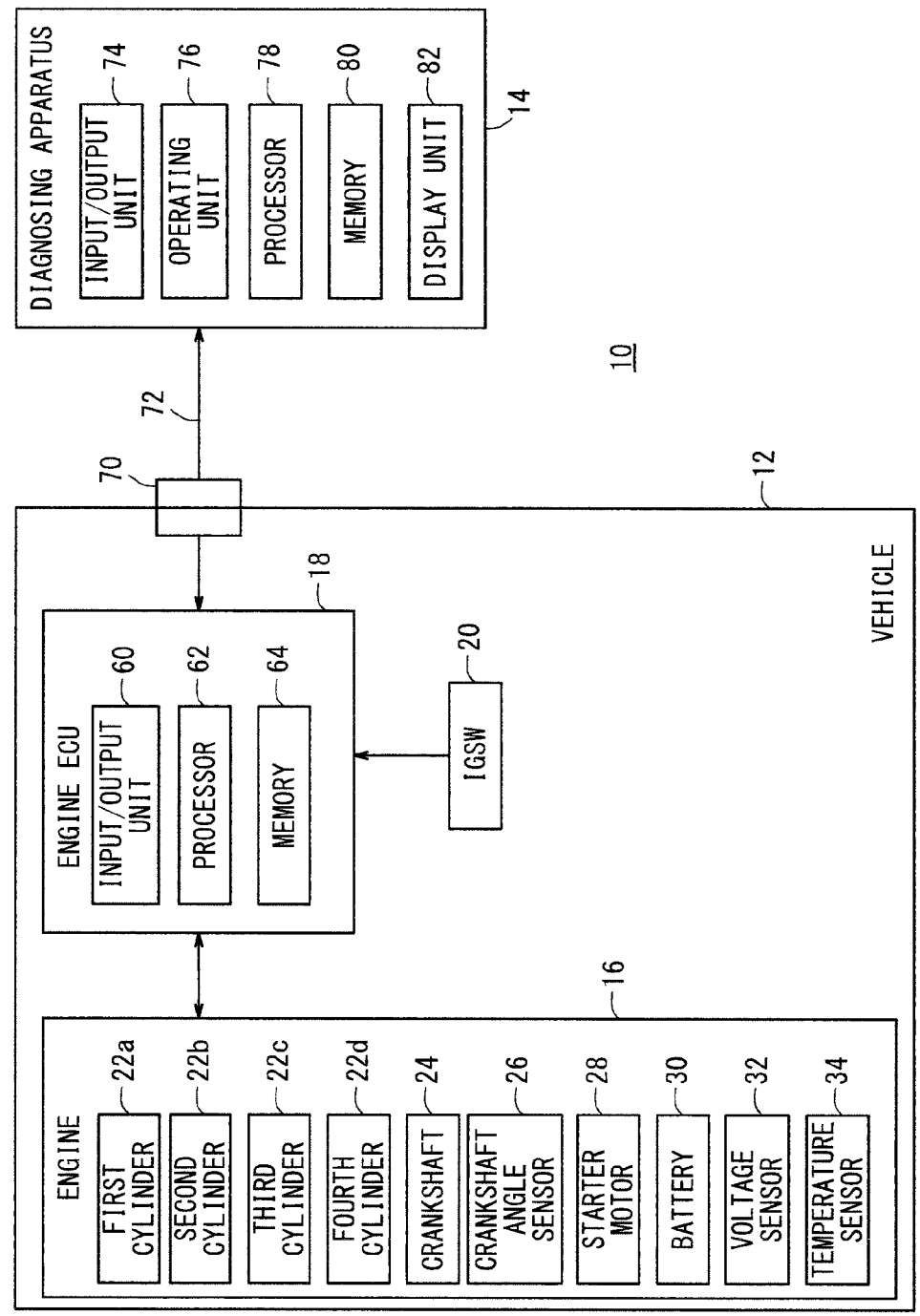
FIG. 1 is a block diagram showing a general configuration of an engine diagnosing system having an engine trouble diagnosing apparatus (hereinafter referred to as a "diagnosing apparatus") according to an embodiment of the present invention.

FIG. 1 is a block diagram showing the general configuration of an engine diagnosing system 10 (hereinafter referred to simply as a "system 10") having an engine trouble diagnosing apparatus 14 (hereinafter referred to as a "diagnosing apparatus 14") according to an embodiment of the present invention. The system 10 includes a vehicle 12, which incorporates an engine 16 as an object to be diagnosed, and a diagnosing apparatus 14 for diagnosing the engine 16.
(2) Vehicle 12
(a) Overall Configuration The vehicle 12 includes, in addition to the engine 16, an engine electronic control unit 18 (hereinafter referred to as an "engine ECU 18" or an "ECU 18") for controlling operations of the engine 16, and an ignition switch 20 (hereinafter referred to by "IGSW 20").
(b) Engine 16

As shown in FIG. 1, the engine 16 comprises a so-called in-line four-cylinder engine having first through fourth cylinders 22a through 22d (hereinafter referred to collectively as "cylinders 22"), a crankshaft 24, a crankshaft angle sensor 26, a starter motor 28, a battery 30, a voltage sensor 32, and a temperature sensor 34.

Figure 2:
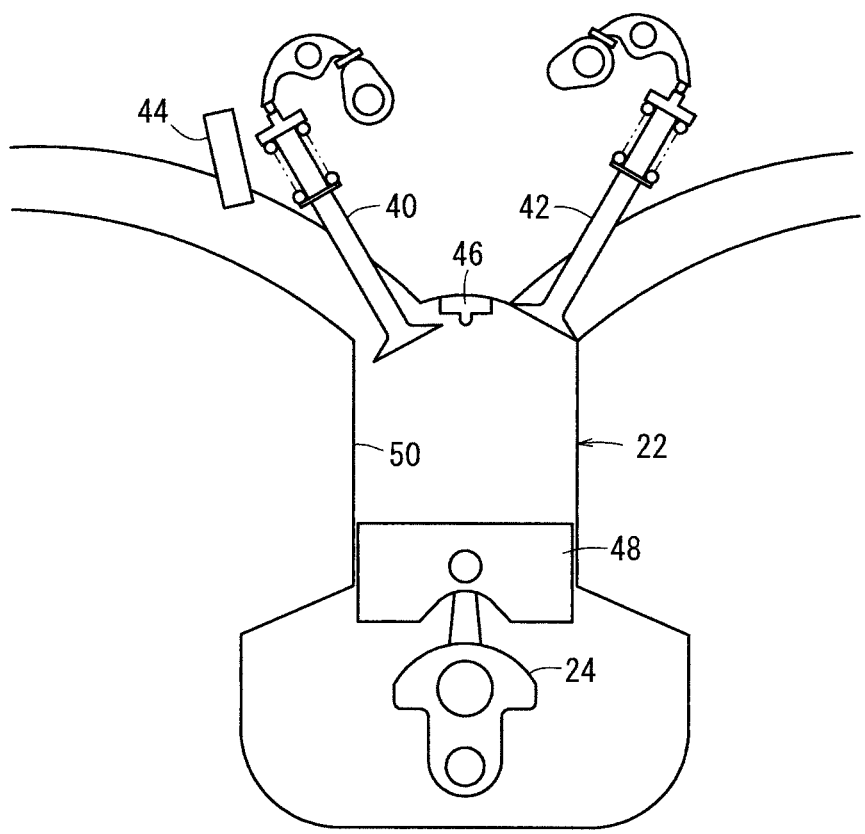
FIG. 2 is a view showing a general internal structure of a cylinder.

FIG. 2 shows the general internal structure of one of the cylinders 22. The cylinder 22 has an intake valve 40, an exhaust valve 42, a fuel injection valve 44, an ignition plug 46, and a piston 48. The intake valve 40, the exhaust valve 42, and the ignition plug 46 are disposed in facing relation to a combustion chamber 50 in the cylinder 22.

Figure 3:
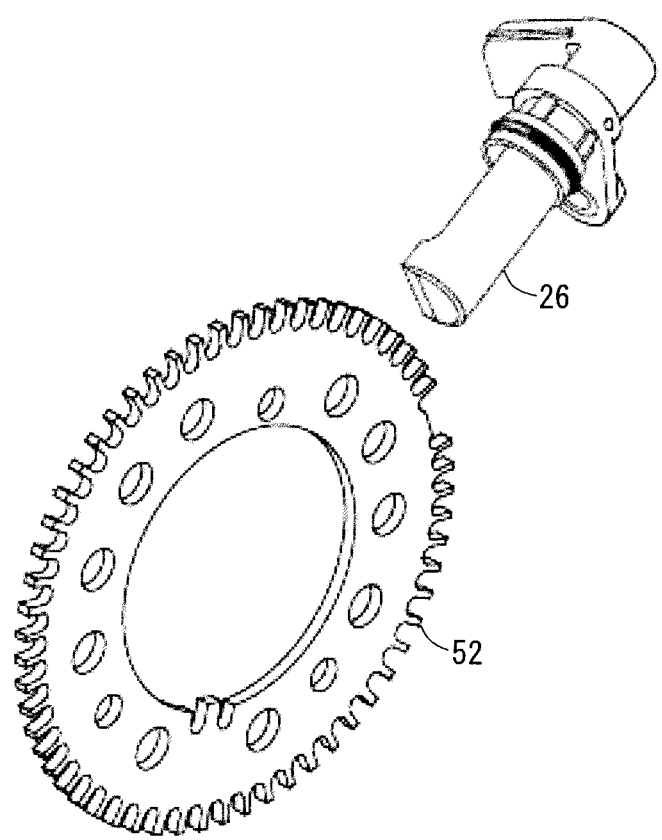
FIG. 3 is a view showing the appearance of a crankshaft angle sensor.
Figure 4:
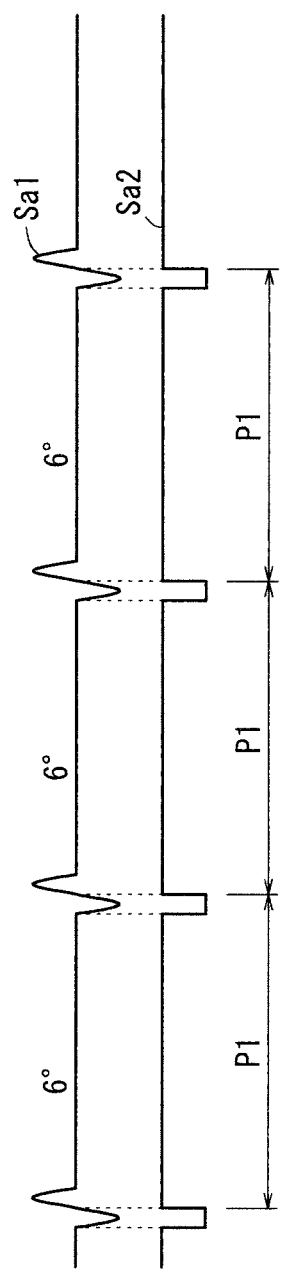
FIG. 4 is a diagram showing by way of example an output signal from the crankshaft angle sensor.

FIG. 3 shows the appearance of the crankshaft angle sensor 26. FIG. 4 shows by way of example an output signal Sa1 from the crankshaft angle sensor 26. The crankshaft angle sensor 26 detects a rotational angle (hereinafter referred to as a "crankshaft angle Ac") [°] of a pulse rotor 52 mounted on the crankshaft 24, and outputs the detected crankshaft angle Ac to the engine ECU 18. More specifically, as shown in FIG. 4, the output signal Sa1 from the crankshaft angle sensor 26 is output as a pulse signal each time that the pulse rotor 52 turns through a predetermined angle (6° in FIG. 4). The ECU 18 receives the output signal Sa1 from the crankshaft angle sensor 26, and shapes the waveform of the output signal Sa1 into a signal Sa2. The ECU 18 measures positive-going periods P1 of the signal Sa2 in order to detect an engine rotational speed NE and an angular velocity (hereinafter referred to as a "crankshaft angular velocity ω" or an "angular velocity ω") of the crankshaft 24.

The starter motor 28 actuates the crankshaft 24 based on electric power supplied from the battery 30. The voltage sensor 32 detects an output voltage Vb [V] of the battery 30, and outputs the detected output voltage Vb to the ECU 18.

The temperature sensor 34 detects the temperature Tw [° C.] of an engine coolant, not shown, and outputs the detected temperature Tw to the ECU 18. The temperature sensor 34 may also detect the temperature To [° C.] of an engine oil, not shown.
(c) Engine ECU 18

The engine ECU 18 serves to control operations of the engine 16. As shown in FIG. 1, the engine ECU 18 has an input/output unit 60, a processor 62, and a memory 64.
(3) Diagnosing Apparatus 14

The diagnosing apparatus 14 serves to diagnose the engine 16 for faults. As shown in FIG. 1, the diagnosing apparatus 14 includes a cable 72 that connects to the engine ECU 18 through a data link connector 70 on the vehicle 12 for inputting and outputting intravehicular data, an input/output unit 74 to which the cable 72 is connected, an operating unit 76 in the form of a keyboard, a touch pad, etc., not shown, a processor 78 for controlling various components and judging each of the cylinders 22 for a malfunction, a memory 80 for storing various data and various programs including a control program used by the processor 78 and a trouble diagnosing program, and a display unit 82 for displaying various items of information.

The diagnosing apparatus 14 may consist of hardware in the form of a commercially available laptop computer, for example.

Figure 5:
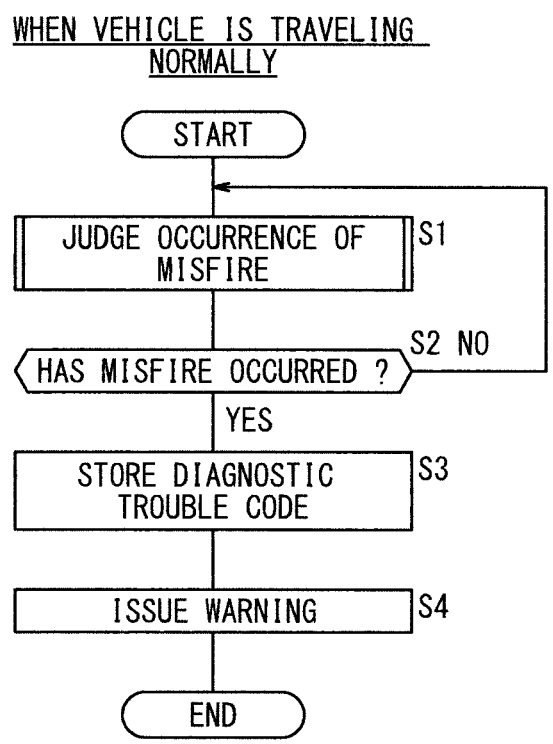
FIG. 5 is a flowchart of a sequence of an engine ECU for judging whether or not a misfire has occurred in a cylinder when the vehicle travels normally, i.e., when the engine is under normal operation.

For diagnosing each of the cylinders 22 for faults using the diagnosing apparatus 14, the operator (user) connects one end of the cable 72 to the input/output unit 74 and the other end of the cable 72 to the data link connector 70, which is mounted on an instrument panel, not shown, of the vehicle 12. Thereafter, the operator operates the operating unit 76 in order to instruct the diagnosing apparatus 14 to diagnose each of the cylinders 22 for faults. The diagnosing apparatus 14 causes the engine ECU 18 to operate the engine 16. Details of a process carried out by the diagnosing apparatus 14 to diagnose each of the cylinders 22 for faults will be described later.
2. Diagnosis of Cylinders 22 for Faults
(1) Outline of Fault Diagnosis According to the present embodiment, while the vehicle 12 is traveling normally, i.e., while the engine 16 is operating normally, the engine ECU 18 judges whether or not a misfire has occurred in the cylinders 22a through 22d. If the engine ECU 18 detects the occurrence of a misfire, then the engine ECU 18 stores a diagnostic trouble code indicative of which one of the cylinders 22a through 22d is suffering from a misfire, and displays the diagnostic trouble code via a warning lamp, not shown, on the instrument panel. In the event that the engine ECU 18 judges that a misfire has occurred, the operator connects the diagnosing apparatus 14 to the ECU 18 and operates the diagnosing apparatus 14 in order to perform a trouble diagnosis, whereupon the diagnosing apparatus 14 judges whether or not there is a shortage of compression pressure in the cylinders 22a through 22d. Based on the judgment made by the diagnosing apparatus 14, the operator carries out subsequent inspection and repair processes.
(2) Judgment of a Misfire
(a) Outline of Judgment of a Misfire FIG. 5 is a flowchart of a sequence of the engine ECU 18 for judging whether or not a misfire has occurred in the cylinders 22a through 22d when the vehicle 12 is traveling normally, i.e., when the engine 16 is operating normally.

In step S1, the ECU 18 judges whether or not a misfire has occurred in the cylinders 22a through 22d. If no misfire has occurred in any one of the cylinders 22a through 22d (S2: NO), then control returns to step S1. If a misfire has occurred in any one of the cylinders 22a through 22d (S2: YES), then the ECU 18 stores a diagnostic trouble code (DTC), which indicates the occurrence of the misfire and the cylinder 22 that has misfired, in the memory 64. In step S4, the ECU 18 issues a warning by turning on the warning lamp, not shown, thereby indicating to the user that the engine 16 has suffered from a fault. In response to the warning, the operator or user takes the vehicle 12 to a repair shop or the like.

(b) Principles of Judgment of a Misfire

FIG. 6 shows a model representation of the relationship between strokes of a piston 48 in each of the cylinders 22a through 22d and the magnitude of a load L1 applied to the crankshaft 24 as the piston 48 operates during normal operation of the engine 16, at times when the cylinder 22 operates normally and when the cylinder 22 suffers from a misfire. The load L1 causes a reduction in the engine rotational speed NE [rpm], i.e., a reduction in the angular velocity ω of the crankshaft 24.

In the example shown in FIG. 6, the load L1 remains essentially unchanged when the cylinder 22 is operating normally as well as when the cylinder 22 suffers from a misfire, as long as the cylinder 22 is in the intake stroke, the compression stroke, and the exhaust stroke. However, when the cylinder 22 is operating normally at the time that the cylinder 22 is in the power stroke, an explosion in the cylinder 22 produces a torque, which increases the engine rotational speed NE, thereby reducing the load L1.

Consequently, it is possible to judge that a misfire has occurred based on the fact that the angular velocity ω in the power stroke is made lower (a variation thereof is made lower) as a result of the misfire than when the cylinder 22 is operating normally.

(c) Details of Judgment of a Misfire

Figure 7:
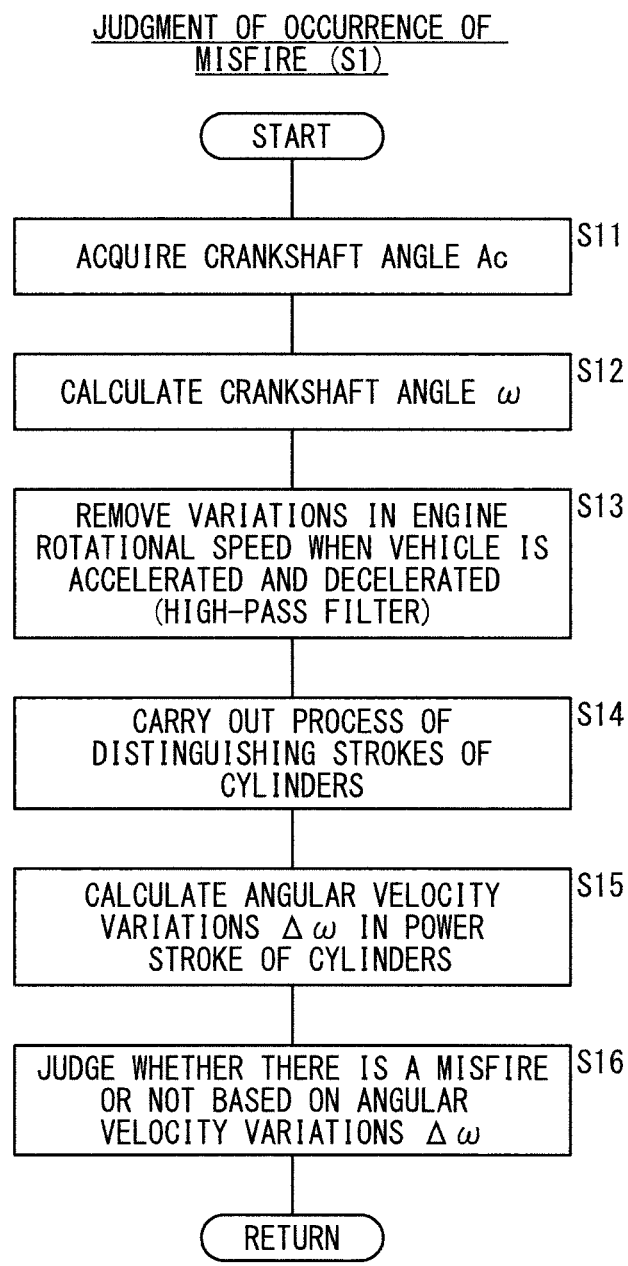
FIG. 7 is a flowchart of a sequence of the engine ECU for judging whether or not a misfire has occurred.

FIG. 7 is a flowchart of a sequence (details of step S1 of FIG. 5) of the ECU 18 for judging whether or not a misfire has occurred. In step S11, the ECU 18 acquires a crankshaft angle Ac from the crankshaft angle sensor 26. In step S12, the ECU 18 calculates a crankshaft angular velocity ω based on the acquired crankshaft angle Ac.

Figure 8:
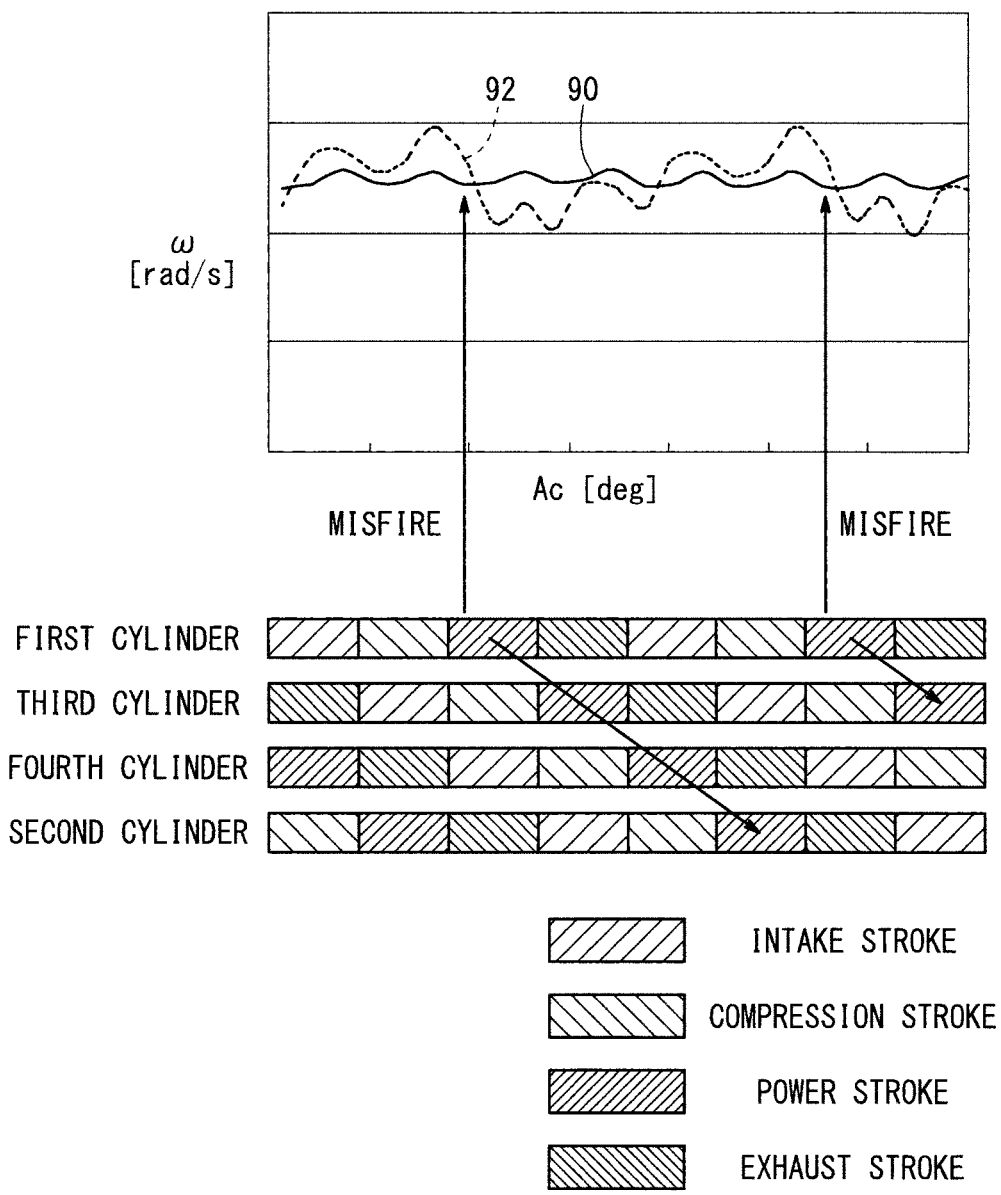
FIG. 8 is a diagram showing by way of example a relationship between crankshaft angles and crankshaft angular velocities and strokes (intake, compression, power, and exhaust strokes) of cylinders, when first through fourth cylinders operate normally and the first cylinder suffers from a misfire.

FIG. 8 shows by way of example a relationship between crankshaft angles Ac and crankshaft angular velocities ω together with strokes (intake, compression, power, and exhaust strokes) of the cylinders 22a through 22d at times that the cylinders 22a through 22d are operating normally and when the first cylinder 22a is suffering from a misfire. In FIG. 8, the solid-line curve 90 represents a relationship between crankshaft angles Ac and crankshaft angular velocities ω at times that the cylinders 22a through 22d are operating normally, whereas the broken-line curve 92 represents a relationship between crankshaft angles Ac and crankshaft angular velocities ω at a time when the first cylinder 22a is misfiring.

In the example shown in FIG. 8, the angular velocity ω sharply drops during the power stroke of the first cylinder 22a. Therefore, the first cylinder 22a can be judged as misfiring.

In step S13 of FIG. 7, using a non-illustrated high-pass filter, the ECU 18 removes variations in the engine rotational speed NE, which are caused when the vehicle 12 is accelerated and decelerated.

In step S14, the ECU 18 carries out a process of distinguishing strokes of each of the cylinders 22 (stroke distinguishing process). More specifically, certain crankshaft angles Ac are determined as corresponding to power strokes of the cylinders 22a through 22d. In the present embodiment, since the engine 16 is a four-cylinder engine, the strokes, i.e., the intake, compression, power, and exhaust strokes, of the cylinders 22a through 22d occur successively in two revolutions (720°) of the crankshaft 24. Consequently, crankshaft angles Ac, which are incremented by 180° (=720°/4), are assigned respectively to the power strokes of the cylinders 22a through 22d.

In step S15, the ECU 18 calculates an angular velocity variation Δω during the power strokes of each of the cylinders 22. For example, the ECU 18 may calculate the angular velocity variation Δω as a difference between an angular velocity ω at the start of the power stroke and an angular velocity ω at the end of the power stroke of each of the cylinders 22. Alternatively, the ECU 18 may calculate the angular velocity variation Δω as a difference between greatest and smallest values of the angular velocity ω during the power stroke of each of the cylinders 22.

Figure 9:
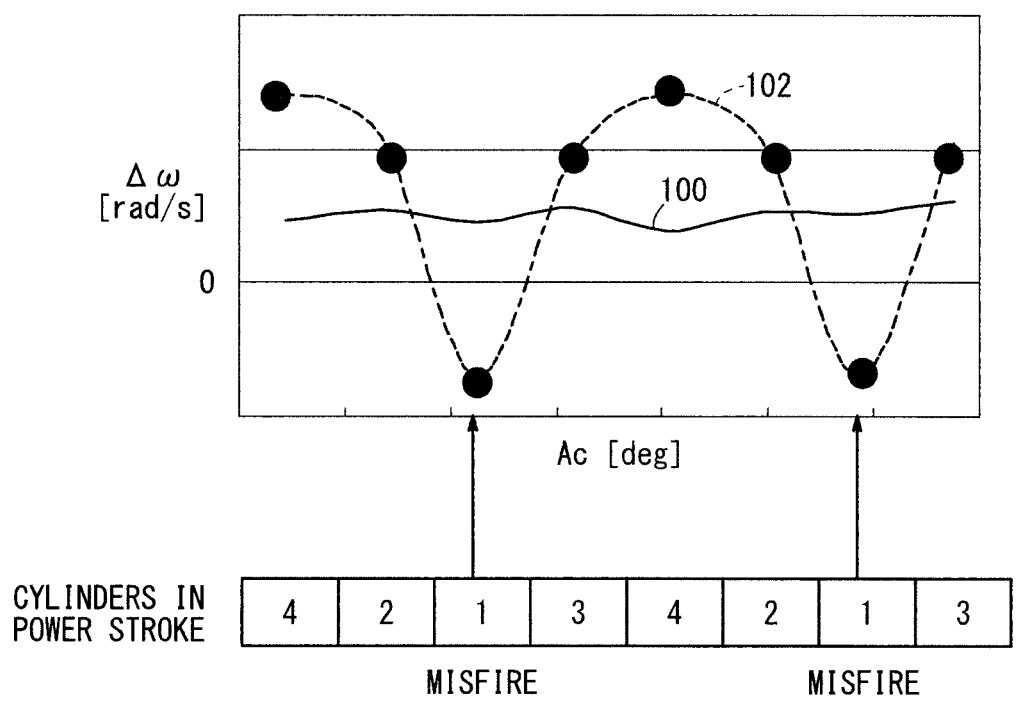
FIG. 9 is a diagram showing a relationship between crankshaft angles and variations in angular velocity shown in FIG. 8 together with power strokes of the cylinders.

FIG. 9 shows a relationship between crankshaft angles Ac and angular velocity variations Δω, which correspond to the data shown in FIG. 8 and the power strokes of the cylinders 22a through 22d. In FIG. 9, the solid-line curve 100 represents a relationship between crankshaft angles Ac and angular velocity variations Δω during a time that the cylinders 22a through 22d are operating normally, whereas the broken-line curve 102 represents a relationship between crankshaft angles Ac and angular velocity variations Δω during a time that the first cylinder 22a is misfiring. The broken-line curve 102 indicates negative angular velocity variations Δω during the power strokes of the misfiring cylinder.

In step S16 of FIG. 7, the ECU 18 judges whether or not a misfire is occurring in the cylinders 22a through 22d, based on the angular velocity variations Δω during the power strokes of the cylinders 22a through 22d. More specifically, the ECU 18 judges that a misfire has occurred if the angular velocity variation Δω drops to a negative value, and further determines that the cylinder, which is in the power stroke corresponding to the negative angular velocity variation Δω, is a misfiring cylinder.

(d) Diagnostic Trouble Code

According to the present embodiment, as described above, a diagnostic trouble code is indicative of the occurrence of a misfire and any one of the cylinders 22a through 22d that has suffered from a misfire. For example, if a misfire has occurred in the first cylinder 22a, then a diagnostic trouble code "P0301" is stored in the ECU 18. If a misfire has occurred in the second cylinder 22b, then a diagnostic trouble code "P0302" is stored in the ECU 18. If a misfire has occurred in the third cylinder 22c, then a diagnostic trouble code "P0303" is stored in the ECU 18. If a misfire has occurred in the fourth cylinder 22d, then a diagnostic trouble code "P0304" is stored in the ECU 18.

Figure 10:
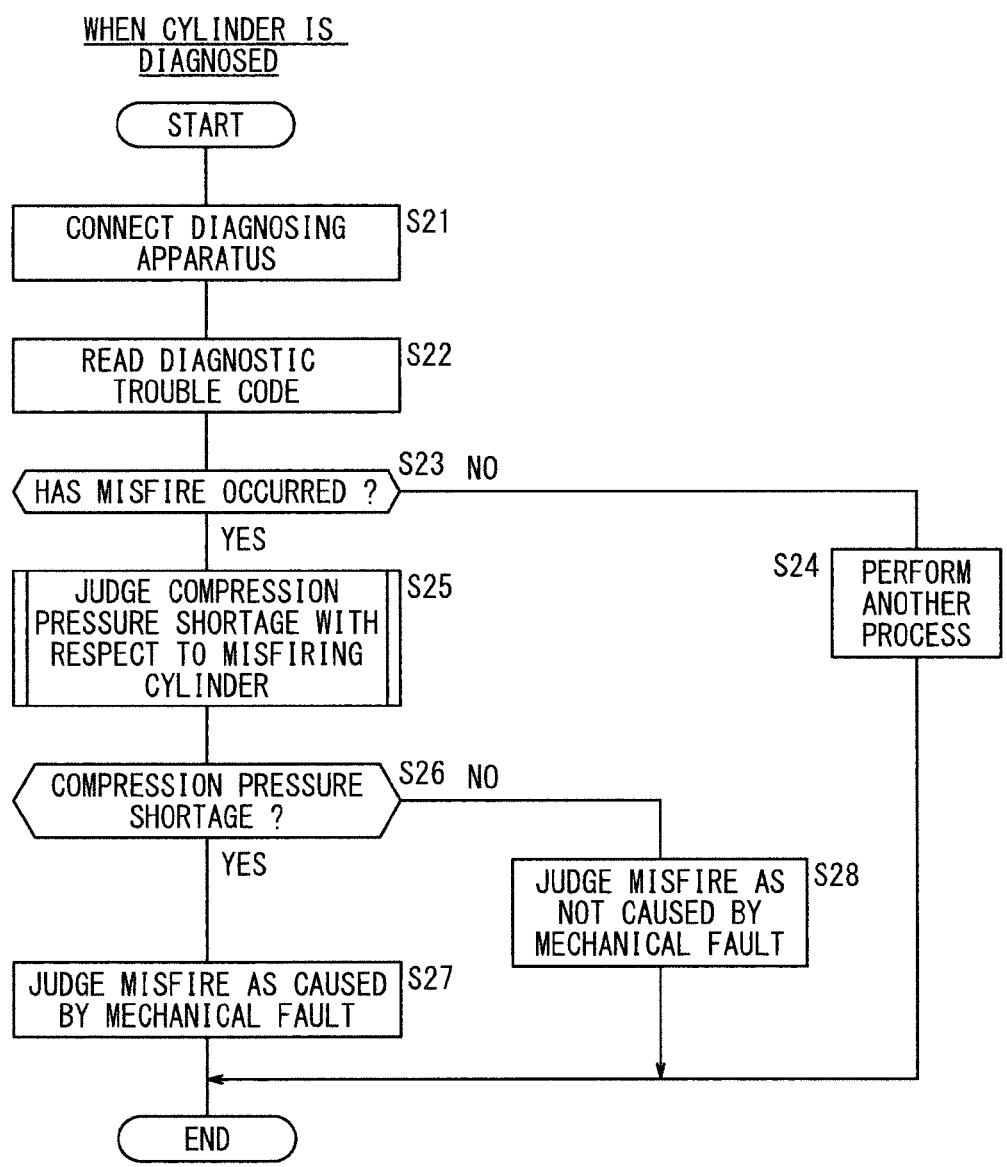
FIG. 10 is a flowchart of a sequence for judging whether or not a compression pressure failure is occurring in each cylinder after the engine ECU has warned of the occurrence of a misfire.

(4) Judgment of Shortage of Compression Pressure (a) Outline of Judgment of Shortage of Compression Pressure FIG. 10 is a flowchart of a sequence for judging whether or not a compression pressure failure is occurring in each of the cylinders 22a through 22d after the engine ECU 18 has warned of the occurrence of a misfire.

In step S21, the operator connects the diagnosing apparatus 14 to the ECU 18 through the cable 72 and the data link connector 70. In step S22, the operator operates the operating unit 76 in order to instruct the diagnosing apparatus 14 to read a diagnostic trouble code (DTC) from the ECU 18.

In step S23, the operator judges whether or not the read diagnostic trouble code indicates the occurrence of a misfire. If the diagnostic trouble code does not indicate a misfire (S23: NO), then in step S24, the operator performs a diagnostic process depending on the diagnostic trouble code.

If the diagnostic trouble code indicates that a misfire has occurred (S23: YES), then in step S25, the diagnosing apparatus 14 judges whether or not there is a shortage of compression pressure in the cylinder 22 that the diagnostic trouble code indicates is misfiring (misfiring cylinder). When the diagnosing apparatus 14 judges a shortage of compression pressure, as will be described in detail later, the diagnosing apparatus 14 cranks the engine 16 in order to rotate the crankshaft 24, while at the same time stopping supply of fuel and igniting the fuel in the cylinders 22a through 22d in order to prevent further fuel explosions therein.

If a shortage of compression pressure exists in the cylinder 22 (S26: YES), then in step S27, the diagnosing apparatus 14 judges that the misfire occurring in the misfiring cylinder is caused by a mechanical fault, and displays the mechanical fault responsible for the misfire together with subsequent inspection and repair processes on the display unit 82. The operator then carries out the inspection and repair processes according to the displayed information.

If a shortage of compression pressure does not exist in the cylinder 22 (S26: NO), then in step S28, the diagnosing apparatus 14 judges that the misfire occurring in the misfiring cylinder is caused not by a mechanical fault, but by an electrical fault, for example, and displays the electrical fault responsible for the misfire together with subsequent inspection and repair processes on the display unit 82. The operator then carries out the inspection and repair processes according to the displayed information.

(b) Principles of Judgment of Shortage of Compression Pressure

As described above, when the diagnosing apparatus according to the present embodiment makes a judgment concerning a shortage of compression pressure, the engine 16 is cranked in order to rotate the crankshaft 24, while at the same time the diagnosing apparatus 14 cancels explosion of fuel in the cylinders 22a through 22d, as described above. While the crankshaft 24 is being rotated while explosion of fuel is canceled in the cylinders 22a through 22d, if the compression pressure in either one of the cylinders 22a through 22d is lowered due to a change in the tappet clearance or the like, then upon engine cranking, the engine rotational speed NE or the crankshaft angular velocity $\omega$ tends to vary greatly.

Figure 11:
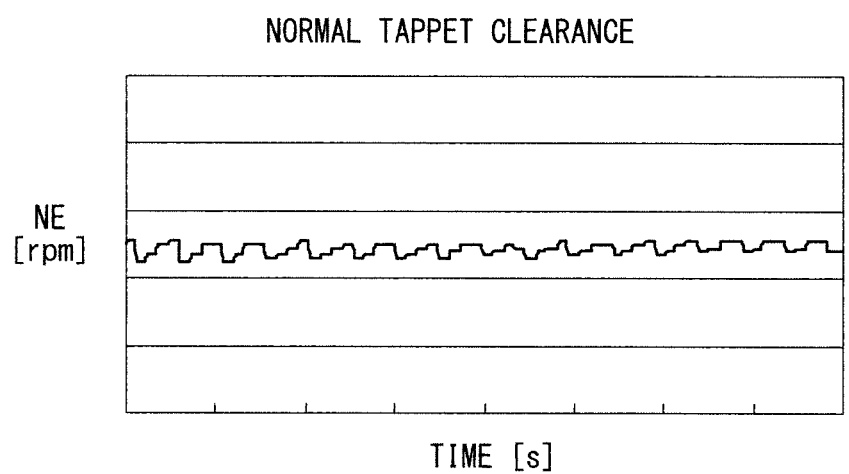
FIG. 11 is a diagram showing by way of example changes in engine rotational speed in the event that a tappet clearance is normal.
Figure 12:
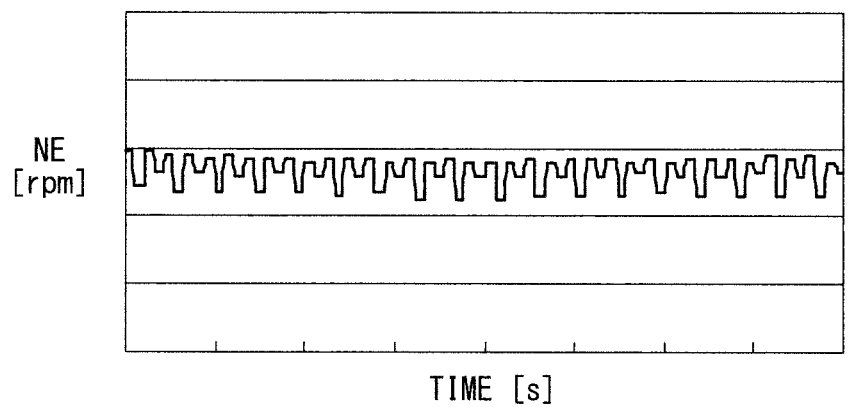
FIG. 12 is a diagram showing by way of example changes in engine rotational speed in the event that the tappet clearance is large.
Figure 13:
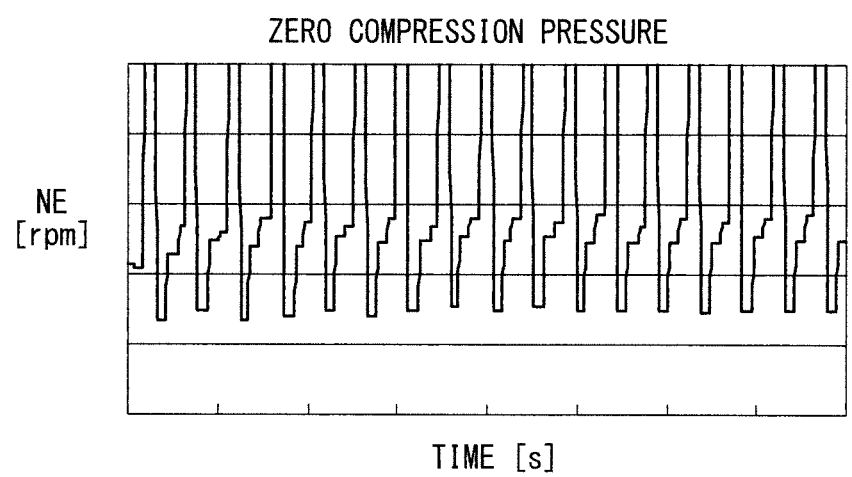
FIG. 13 is a diagram showing by way of example changes in engine rotational speed NE in the event of no compression pressure (zero compression pressure)

FIG. 11 is a diagram showing by way of example changes in the engine rotational speed NE in the event that a tappet clearance TC is normal. FIG. 12 is a diagram showing by way of example changes in the engine rotational speed NE in the event that the tappet clearance TC exhibits a large deviation (e.g., TC=0.2 mm). FIG. 13 is a diagram showing by way of example changes in the engine rotational speed NE in the event of no compression pressure (zero compression pressure). Generally, the tappet clearance represents a gap between the shaft of an intake value or an exhaust valve and a camshaft or a rocker arm. The tappet clearance affects the opening timing of the valve, which indicates an opening/closing point of the valve, as well as the operation timing of the valve.

FIG. 14 is a diagram showing a model representation of a relationship between strokes of the piston 48 in each of the cylinders 22a through 22d, and the magnitude of a load L1 applied to the crankshaft 24 as the piston 48 operates during cranking of the engine, at a time that the cylinder 22 is operating normally and at a time that the cylinder 22 is suffering from a shortage of compression pressure. The load L1 causes a reduction in the engine rotational speed NE [rpm], i.e., a reduction in the angular velocity $\omega$ of the crankshaft 24. Since fuel explosion is canceled in the cylinders 22a through 22d when the engine is cranked, no actual fuel explosion occurs during the power stroke shown in FIG. 14. Stated otherwise, the power stroke shown in FIG. 14 represents a stroke having the same range of the crankshaft angle Ac as the power stroke during normal operation of the engine.

In the example shown in FIG. 14, the load L1 applied when the cylinder 22 is operating normally and the load L1 applied when the cylinder 22 is suffering from a shortage of compression pressure are compared with each other. The difference between the compared loads L1 is significantly larger in the compression stroke than in the intake stroke, the power stroke, and the exhaust stroke. This is because the compressive load is small when a gas leakage exists somewhere in the cylinder 22.

With an engine 16 having plural cylinders 22a through 22d, the strokes of the cylinders 22a through 22d are kept out of phase with each other, so as to produce regular angular velocity variations $\Delta\omega$ while allowing the engine 16 to be cranked stably during normal operation. However, when a compression failure occurs in any one of the cylinders 22a through 22d, the compressive load is not applied as required, thereby causing a disturbance in the angular velocity variations $\Delta\omega$.

According to the present invention, which is based on the above observations, the difference between the loads L1 in the compression stroke is not used directly, but rather, angular velocity variations $\Delta\omega$ in the power stroke are used to judge a shortage of compression pressure, similar to the case of judging the presence of a misfire (see FIG. 9, etc.). More specifically, such a judgment is based on the fact that, when the engine 16 having the cylinders 22a through 22d including one cylinder that suffers from a shortage of compression pressure is cranked, the crankshaft angular velocity $\omega$ increases in the compression stroke of the cylinder that suffers from a shortage of compression pressure, but in reaction thereto, decreases in the next stroke, i.e., the power stroke, of the same cylinder. Thus, it is possible to judge whether or not there is a shortage of compression pressure based on a reduction (variation) in the angular velocity $\omega$ in the power stroke. Accordingly, a similar logic to that used for judging the presence of a misfire can be used as the logic for judging a cylinder that suffers from a shortage of compression pressure.

(c) Details of Judgment of Shortage of Compression Pressure

Figure 15:
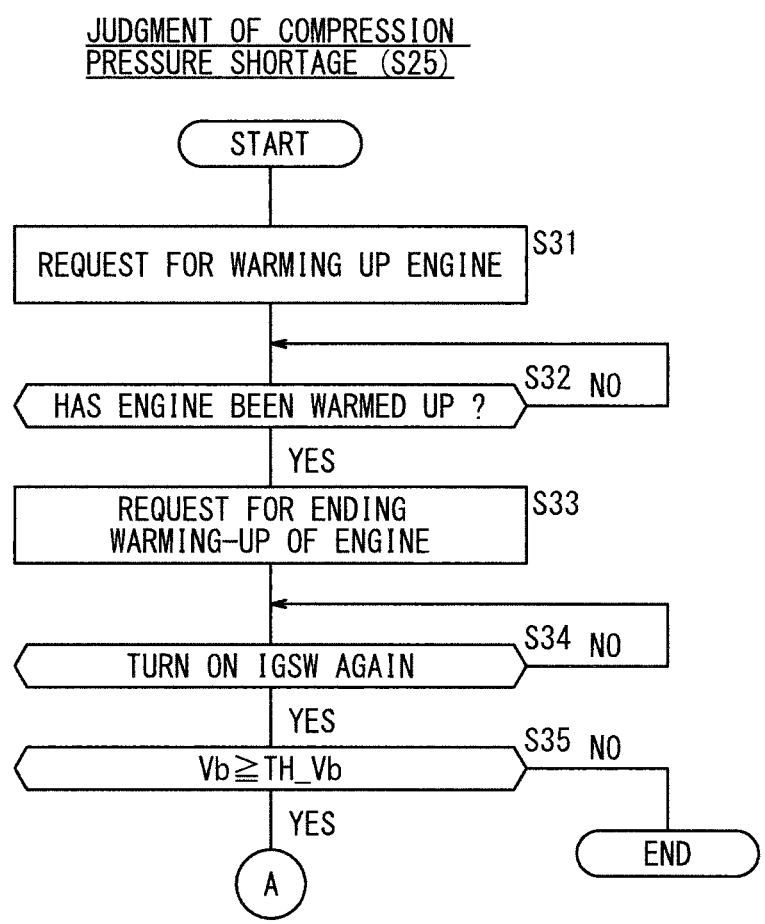
FIG. 15 is a first flowchart of a sequence of the diagnosing apparatus for judging whether or not there is a shortage of compression pressure.
Figure 16:
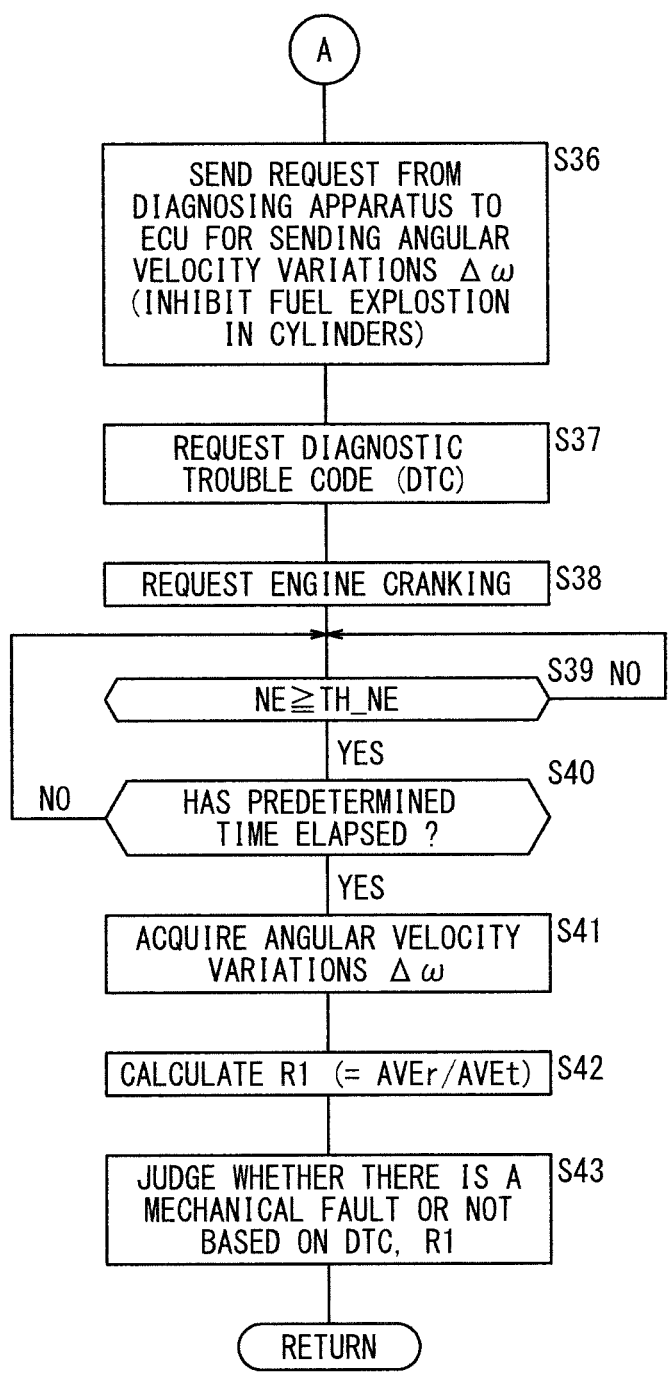
FIG. 16 is a second flowchart of the sequence of the diagnosing apparatus for judging whether or not there is a shortage of compression pressure.
Figure 17:
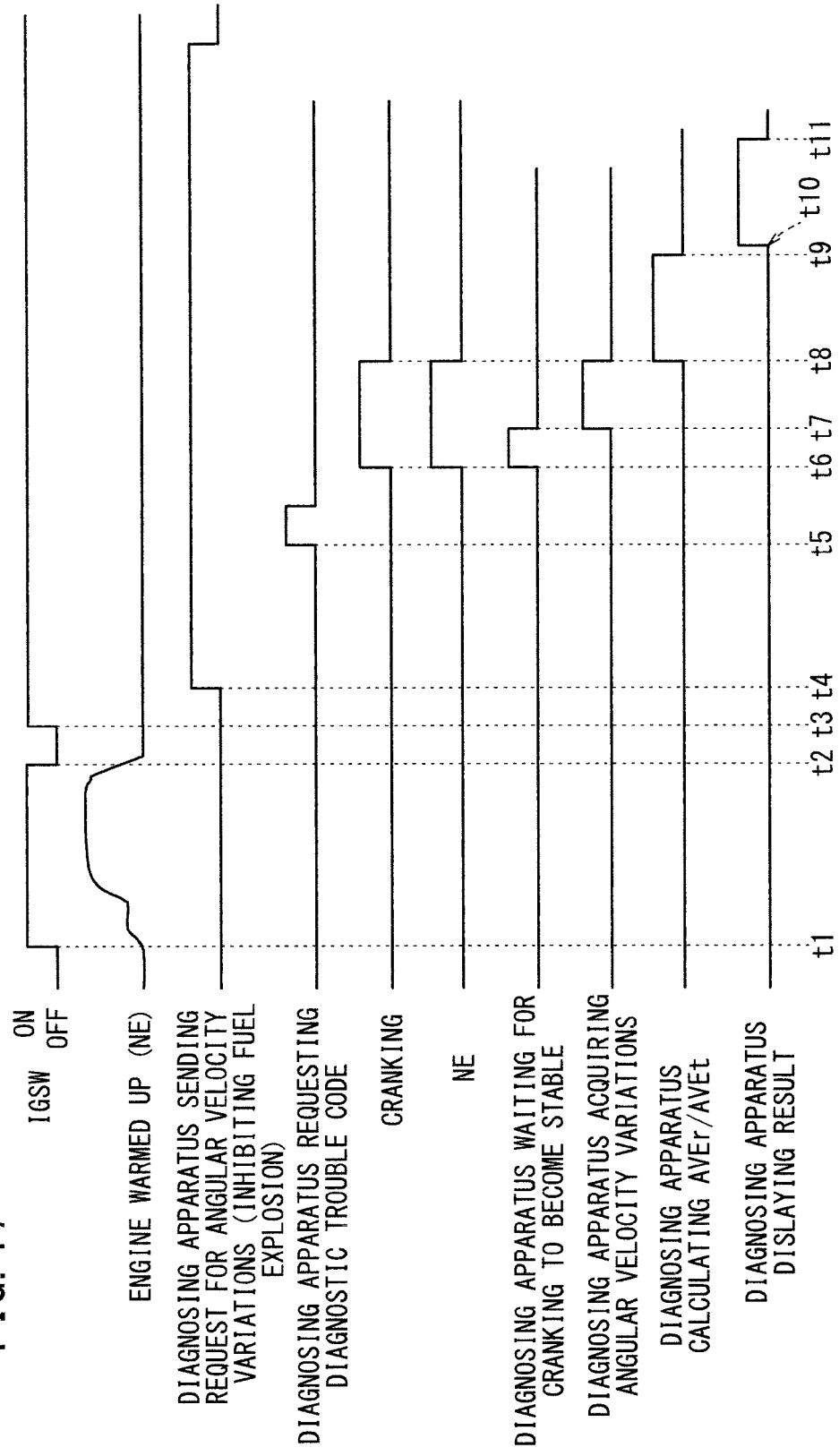
FIG. 17 is a timing chart of events that occur when the sequences of the flowcharts shown in FIGS. 15 and 16 are carried out.

FIG. 15 is a first flowchart of a sequence of the diagnosing apparatus 14 for judging whether or not there is a shortage of compression pressure. FIG. 16 is a second flowchart of the sequence of the diagnosing apparatus 14 for judging whether or not there is a shortage of compression pressure. FIG. 17 is a timing chart of events that occur when the sequences of the flowcharts shown in FIGS. 15 and 16 are carried out.

In step S31 of FIG. 15, the diagnosing apparatus 14 displays a request to warm up the engine on the display unit 82. Upon observing the displayed message, the operator turns on the IGSW 20 in order to start warming up the engine (time t1). The operator warms up the engine by increasing the engine rotational speed NE up to a predetermined warm-up speed, e.g., 3000 rpm.

In step S32, the diagnosing apparatus 14 judges whether or not the engine has been warmed up. More specifically, through the ECU 18, the diagnosing apparatus 14 acquires a temperature Tw from the temperature sensor 34, and judges whether or not the acquired temperature Tw is equal to or greater than a threshold value THw, which is indicative of the engine being in a warmed up condition. If the engine is not warmed up (S32: NO), then the diagnosing apparatus 14 repeats step S32.

If the engine is warmed up (S32: YES), then in step S33, the diagnosing apparatus 14 controls the display unit 82 in order to display a request for ending warming-up of the engine. The request includes a request to turn off the IGSW 20, and thereafter, to turn on the IGSW 20 again. After observing the displayed request, the operator turns off the IGSW 20 (time t2), and then turns on the IGSW 20 again in order to initiate a measurement process (time t3).

When the operator turns on the IGSW 20 again (S34: YES), the diagnosing apparatus 14 acquires a voltage Vb of the battery 30 from the voltage sensor 32 via the ECU 18, and in step S35, judges whether or not the acquired voltage Vb is equal to or greater than a threshold value concerning the voltage Vb (battery voltage threshold value TH_Vb). The battery voltage threshold value TH_Vb is a threshold value by which it is judged whether or not cranking of the engine, which is performed by the starter motor 28, has become stable.

If the voltage Vb is lower than the battery voltage threshold value TH_Vb (S35: NO), then the sequence for judging whether or not there is a shortage of compression pressure is ended. If the voltage Vb is equal to or greater than the battery voltage threshold value TH_Vb (S35: YES), then in step S36 of FIG. 16, the diagnosing apparatus 14 sends a request to the ECU 18 to supply angular velocity variations $\Delta\omega$ that occur during the power strokes of the cylinders 22a through 22d (time t4). The request includes a request for inhibiting fuel explosion in the cylinders 22a through 22d by stopping supply of fuel and keeping the ignition signals off.

In step S37, the diagnosing apparatus 14 sends a request to the ECU 18 to transmit a diagnostic trouble code (time t5). In response to the request, the ECU 18 transmits a diagnostic trouble code to the diagnosing apparatus 14.

In step S38, the diagnosing apparatus 14 controls the display unit 82 in order to display a request, which asks the operator to crank the engine. Upon observing the request, the operator energizes the starter motor in order to crank the engine (time t6).

In step S39, the diagnosing apparatus 14 judges whether or not the engine rotational speed NE (cranking rotational speed) acquired through the ECU 18 is equal to or greater than a threshold value TH_NE. The threshold value TH_NE is a threshold value by which it can be judged stably that the engine rotational speed NE is high enough to enable determination of a shortage of compression pressure. For example, the threshold value TH_NE is 50 rpm. If the engine rotational speed NE is not equal to or greater than the threshold value TH_NE (S39: NO), then the diagnosing apparatus 14 repeats step S39. If the engine rotational speed NE has not become equal to or greater than the threshold value TH_NE after elapse of a predetermined time (e.g., 30 seconds), then the diagnosing apparatus 14 cancels the cranking request and brings the diagnostic process to an end. If the engine rotational speed NE is equal to or greater than the threshold value TH_NE (S39: YES), then in step S40, the diagnosing apparatus 14 judges whether or not a predetermined time (e.g., 1 second) has elapsed after the engine rotational speed NE has become equal to or greater than the threshold value TH_NE. If the predetermined time has not elapsed (S40: NO), then control returns to step S39.

If the predetermined time has elapsed (S40: YES), then in step S41, the diagnosing apparatus 14 acquires angular velocity variations $\Delta\omega$ from the ECU 18 (from time t7 to t8). More specifically, the ECU 18 detects angular velocity variations $\Delta\omega$ in the same manner as with steps S11 through S15 of FIG. 7, and the ECU 18 sends the detected angular velocity variations $\Delta\omega$ to the diagnosing apparatus 14. When the ECU 18 finishes detecting and sending the angular velocity variations $\Delta\omega$, the operator stops cranking of the engine in response to a display on the display unit 82 of the diagnosing apparatus 14. The operator may also stop cranking of the engine after the ECU 18 has detected the angular velocity variations $\Delta\omega$.

Figure 18:
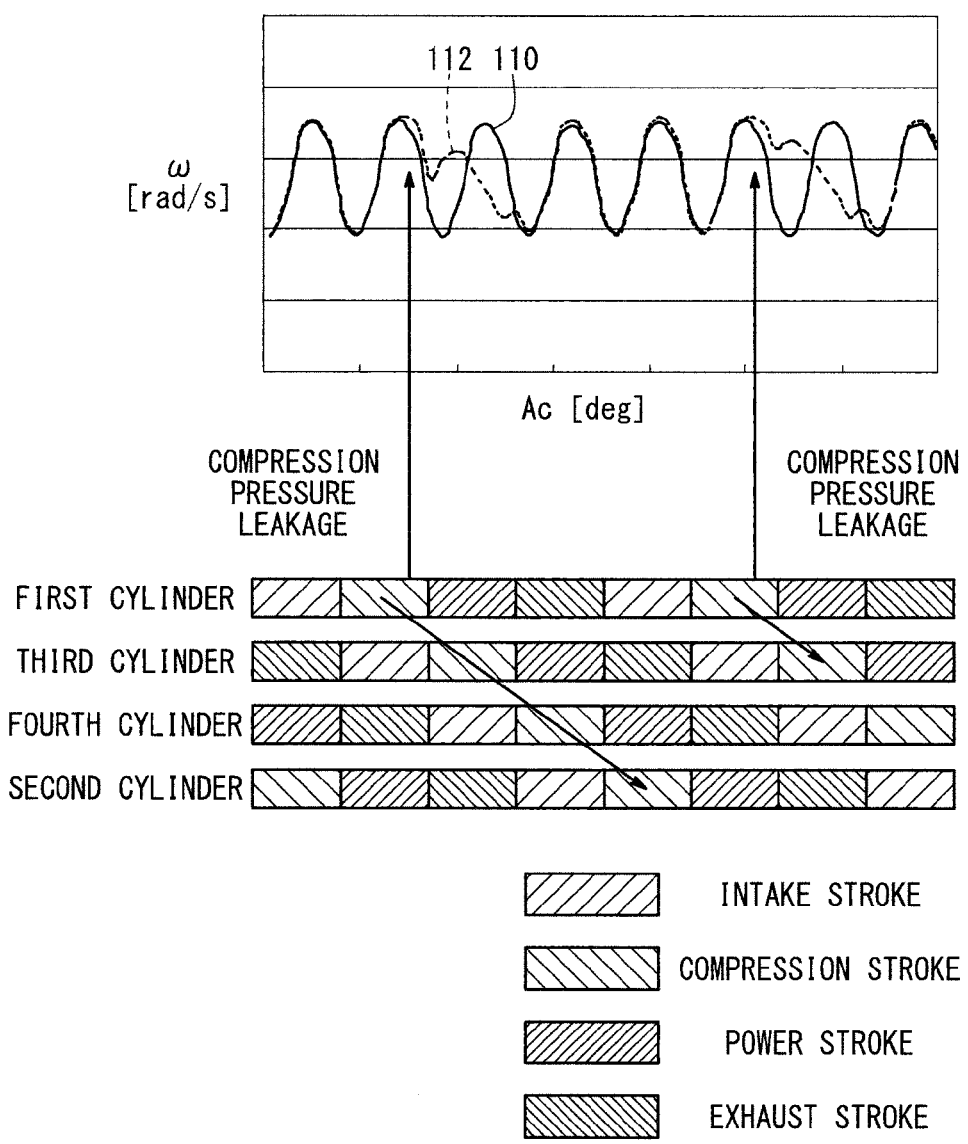
FIG. 18 is a diagram showing by way of example the relationship between crankshaft angles and crankshaft angular velocities and strokes (intake, compression, power, and exhaust strokes) of cylinders, when first through fourth cylinders operate normally and the first cylinder suffers from a misfire while the engine is being cranked.

FIG. 18 shows a model representation of a relationship between crankshaft angles Ac and crankshaft angular velocities $\omega$, and respective strokes (intake, compression, power, and exhaust strokes) of the cylinders 22a through 22d when the cylinders 22a through 22d are operating normally, and when the first cylinder 22a suffers from a misfire while the engine is being cranked. In FIG. 18, the solid-line curve 110 represents a relationship between crankshaft angles Ac and crankshaft angular velocities $\omega$ at a time that the cylinders 22a through 22d are operating normally, whereas the broken-line curve 112 represents a relationship between crankshaft angles Ac and crankshaft angular velocities $\omega$ at a time that the first cylinder 22a is misfiring.

In the example shown in FIG. 18, the angular velocity $\omega$ drops sharply due to a rotational disturbance in the power stroke subsequent to the compression stroke of the first cylinder 22a.

Figure 19:
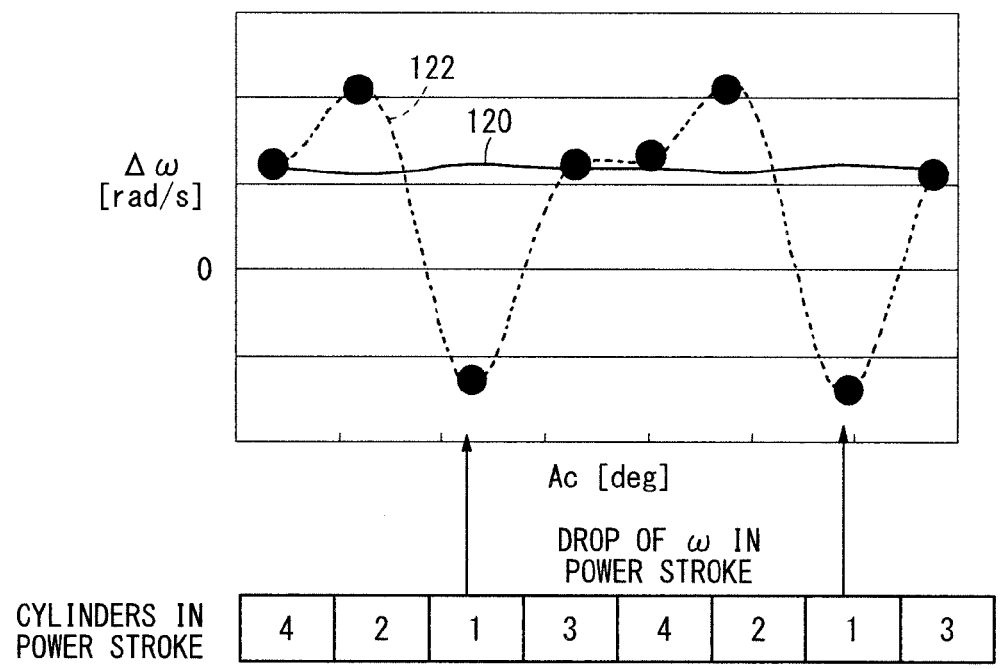
FIG. 19 is a diagram showing a relationship between crankshaft angles and variations in angular velocity shown in FIG. 18 together with power strokes of the cylinders.

FIG. 19 shows a relationship between crankshaft angles Ac and angular velocity variations $\Delta\omega$ corresponding to the data shown in FIG. 18, along with the power strokes of the cylinders 22. In FIG. 19, the solid-line curve 120 represents a relationship between crankshaft angles Ac and angular velocity variations $\Delta\omega$, at a time that the cylinders 22 are operating normally, whereas the broken-line curve 122 represents a relationship between crankshaft angles Ac and angular velocity variations $\Delta\omega$, at a time that the first cylinder 22a is misfiring.

The example shown in FIG. 18 illustrates compression leakage (zero compression pressure) during compression strokes of the first cylinder 22a, in order to clearly show a compression pressure failure. In the example shown in FIG. 19, the angular velocity variations $\Delta\omega$ are reduced during the power stroke of the first cylinder 22a. This is because a compressive load is not applied, while a corresponding increase occurs in the angular velocity variation $\Delta\omega$ during the compression stroke of the first cylinder 22a, and then in reaction thereto, the angular velocity variation $\Delta\omega$ decreases in the power stroke of the first cylinder 22a. It is thus possible to judge whether or not a shortage of compression pressure has occurred in the first cylinder 22a, based on a comparison of angular velocity variations $\Delta\omega$ in each of the power strokes.

In step S42 of FIG. 16, based on the acquired angular velocity variations $\Delta\omega$ (from time t8 to time t9 in FIG. 17), the diagnosing apparatus 14 calculates individual average values AVEr, a total average value AVEt, and ratios R1. The individual average values AVEr represent average values of angular velocity variations $\Delta\omega$ during power strokes of the respective cylinders 22. The total average value AVEt is an average value of the individual average values AVEr of all of the cylinders 22. The ratios R1 (AVEr/AVEt) are calculated by dividing the respective individual average values AVEr by the total average value AVEt.

In step S43, the diagnosing apparatus 14 judges whether or not there is a mechanical fault in any of the cylinders 22, based on the diagnostic trouble code acquired in step S37 and the ratios R1 calculated in step S42, and displays the judgment result on the display unit 82 (from time t10 to time t11).

In particular, the diagnosing apparatus 14 judges whether or not there is a shortage of compression pressure in a misfiring cylinder, based on the ratios R1 with respect to the cylinders 22a through 22d. More specifically, if the ratio R1 with respect to the misfiring cylinder is smaller than a threshold value by which it is judged whether or not there is a shortage of compression pressure (compression force shortage judging threshold value TH2), then the diagnosing apparatus 14 determines that there is a shortage of compression pressure in the misfiring cylinder. According to the present embodiment, the threshold value TH2 is 100%.

Figure 20:
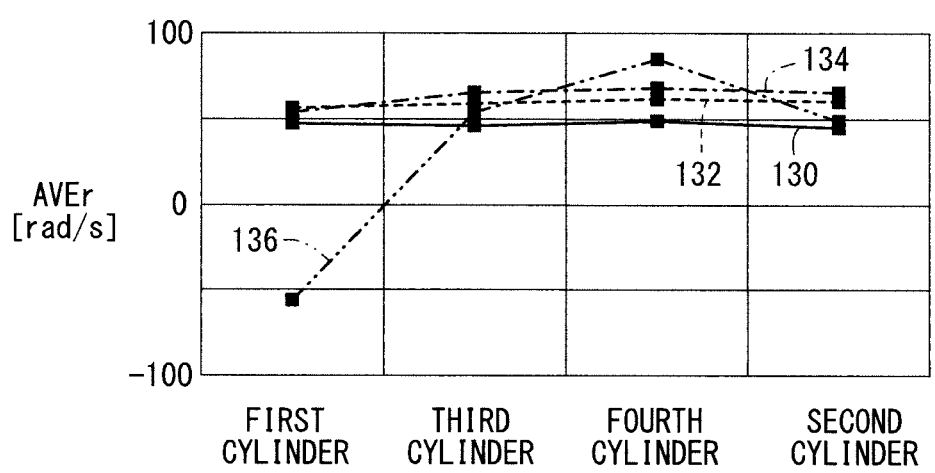
FIG. 20 is a diagram showing by way of example individual average values of variations in angular velocity in the case that the tappet clearance of the first cylinder is normal, in the case that deviation of the tappet clearance is small, in the case that deviation of the tappet clearance is large, and in the case that the compression pressure is zero, at a time that the first cylinder is abnormal and the second through fourth cylinders are normal.

FIG. 20 shows by way of example individual average values AVEr in the case that the tappet clearance TC of the first cylinder 22a is normal (e.g., TC=0.23 mm), in the case that the deviation of the tappet clearance TC is small (e.g., TC=0.13 mm), in the case that the deviation of the tappet clearance TC is large (e.g., TC=0.05 mm), and in the case that the compression pressure is zero, at a time when the first cylinder 22a is abnormal and the second through fourth cylinders 22b through 22d are normal.

The solid-line curve 130 represents individual average values AVEr in the case that the tappet clearance TC of the first cylinder 22a is normal (e.g., TC=0.23 mm). The broken-line curve 132 represents individual average values AVEr in the case that the deviation of the tappet clearance TC is small (e.g., TC=0.13 mm). The dot-and-dash-line curve 134 represents individual average values AVEr in the case that the deviation of the tappet clearance TC is large (e.g., TC=0.05 mm). The two-dot-and-dash-line curve 136 represents individual average values AVEr in the case that the compression pressure is zero.

Figure 21:
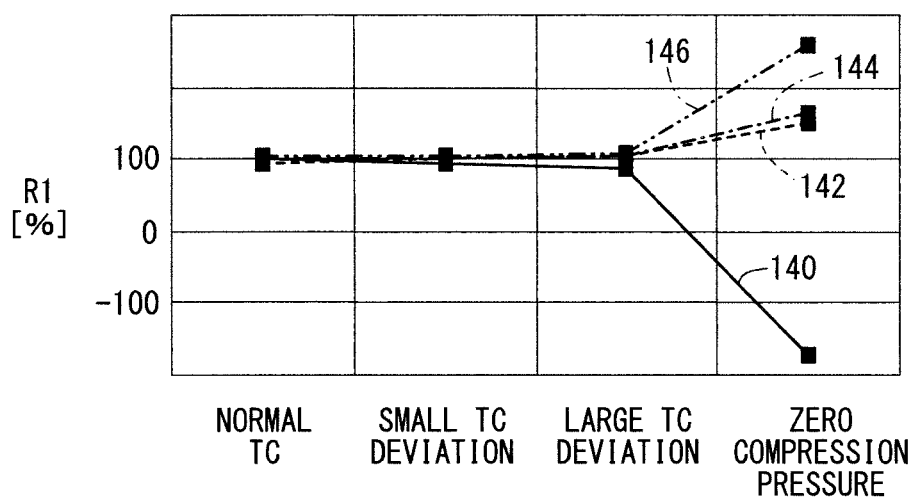
FIG. 21 is a diagram showing ratios of the individual average values to a total average value, based on the individual average values of the cylinders shown in FIG. 20.
Figure 22:
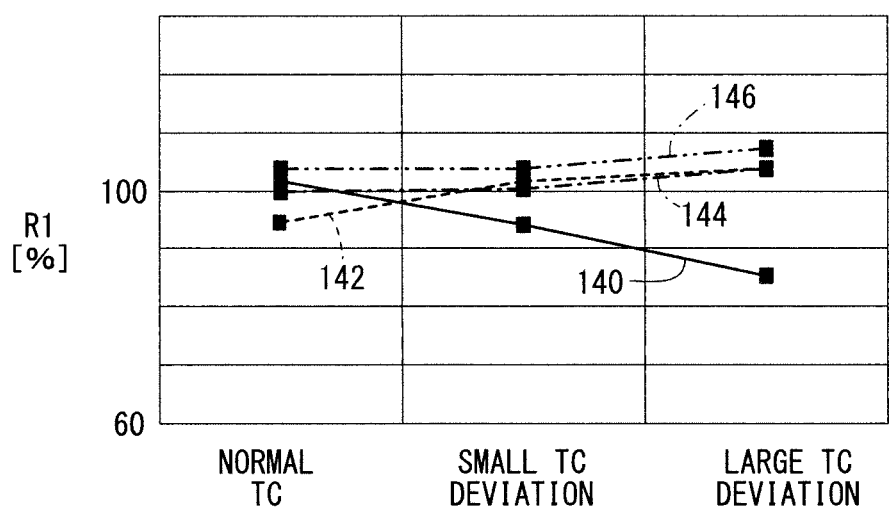
FIG. 22 is a diagram showing at an enlarged scale a portion of the ratios shown in FIG. 21.

FIG. 21 shows ratios R1 (=AVEr/AVEt) of the individual average values AVEr to the total average value AVEt, based on the individual average values AVEr of the cylinders 22a through 22d shown in FIG. 20. FIG. 22 is a diagram, which shows at an enlarged scale a portion of the ratios shown in FIG. 21. In FIGS. 21 and 22, the solid-line curve 140 corresponds to the first cylinder 22a, the broken-line curve 142 corresponds to the second cylinder 22b, the dot-and-dash-line curve 144 corresponds to the third cylinder 22c, and the two-dot-and-dash-line curve 146 corresponds to the fourth cylinder 22d.

FIG. 23 is a diagram showing by way of example angular velocity variations Δω of the cylinders 22, individual average values AVEr, ratios R1 (=AVEr/AVEt), and judgments made by the diagnosing apparatus 14. In the example shown in FIG. 23, the individual average value AVEr of the first cylinder 22a is 44.4 [rad/s], the individual average value AVEr of the second cylinder 22b is 54.0, the individual average value AVEr of the third cylinder 22c is 53.9, and the individual average value AVEr of the fourth cylinder 22d is 55.8. Therefore, the total average value AVEt is 52.03 [rad/s].

The ratio R1 with respect to the first cylinder 22a is 85% (=44.4/52.03), the ratio R1 with respect to the second cylinder 22b is 104% (=54.0/52.03), the ratio R1 with respect to the third cylinder 22c is 104% (53.9/52.03), and the ratio R1 with respect to the fourth cylinder 22d is 107% (55.8/52.03).

The ratio R1 is smaller than the threshold value TH2 (100% in the present embodiment) with respect to the first cylinder 22a. Therefore, the first cylinder 22a is judged as suffering from a shortage of compression pressure. If the diagnostic trouble code stored in the ECU 18 represents the occurrence of a misfire in the first cylinder 22a, then the first cylinder 22a is judged as "NO GOOD" and in need of a mechanical fault check. Since the ratios R1 with respect to the second through fourth cylinders 22a through 22d are not smaller than the threshold value TH2, the second through fourth cylinders 22a through 22d are judged as "GOOD" and do not require mechanical fault checks, regardless of the content of the diagnostic trouble code.

(d) Judgment Results Made by Diagnosing Apparatus

Figure 24:
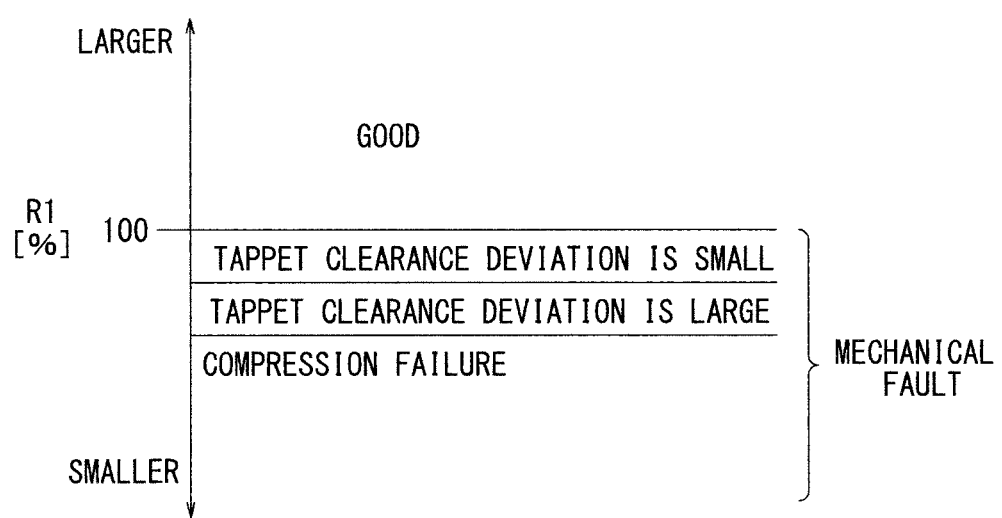
FIG. 24 is a diagram showing by way of example indications used to display on a display unit mechanical faults judged by the diagnosing apparatus as causes of a misfire in a misfiring cylinder, and an inspection process and a repair process to be carried out subsequently.

FIG. 24 shows by way of example indications that are displayed on the display unit 82 to indicate mechanical troubles judged by the diagnosing apparatus 14 as being responsible for a misfire in a misfiring cylinder, together with an inspection process and a repair process to be carried out subsequently. In FIG. 24, the indications are displayed in three stages depending on the magnitudes of the ratios R1, i.e., "SMALL TAPPET CLEARANCE DEVIATION", "LARGE TAPPET CLEARANCE DEVIATION", and "COMPRESSION FAILURE". The indication of "COMPRESSION FAILURE" includes damage to the cylinders 22a through 22d, failures of pistons, not shown, etc.

If the ratio R1 is slightly smaller than 100%, then the diagnosing apparatus 14 displays on the display unit 82 an inspection process and a repair process to be carried out for repairing the small deviation of the tappet clearance TC. If the ratio R1 is considerably smaller than 100%, then the diagnosing apparatus 14 displays on the display unit 82 an inspection process and a repair process to be carried out for repairing the large deviation of the tappet clearance TC. If the ratio R1 is extremely smaller than 100%, then the diagnosing apparatus 14 displays on the display unit 82 an inspection process and a repair process to be carried out for repairing the compression failure.

FIGS. 25 through 30 show first through six examples of relationships between diagnostic trouble codes stored in the ECU 18, ratios R1 calculated by the diagnosing apparatus 14, judgments made by the diagnosing apparatus 14, and inspection items and confirmation areas of the engine 16, which are displayed by the diagnosing apparatus 14 based on the judgments.

In FIG. 25, the diagnostic trouble codes indicate that the first cylinder 22a is misfiring. Since the ratio R1 with respect to the first cylinder 22a is smaller than the threshold value TH2 (100%), the first cylinder 22a is judged as suffering from a shortage of compression pressure. Since the first cylinder 22a both is misfiring and is a cylinder suffering from a shortage of compression pressure, the diagnosing apparatus 14 diagnoses that the first cylinder 22a is "NO GOOD" and is in need of a mechanical fault check. Depending on the ratio R1 with respect to the first cylinder 22a, the diagnosing apparatus 14 displays "POOR TAPPET CLEARANCE" and "POOR COMPRESSION" as inspection terms and confirmation areas with respect to the first cylinder 22a. Inasmuch as the second through fourth cylinders 22b through 22d are not misfiring and do not suffer from a shortage of compression pressure, the diagnosing apparatus 14 judges the second through fourth cylinders 22b through 22d as "GOOD" and not in need of a mechanical fault check.

In FIG. 26, the diagnostic trouble codes indicate that the first cylinder 22a and the third cylinder 22c are misfiring. Since the ratio R1 with respect to the first cylinder 22a is smaller than the threshold value TH2 (100%), the first cylinder 22a is judged as suffering from a shortage of compression pressure. Since the first cylinder 22a both is misfiring and is a cylinder suffering from a shortage of compression pressure, the diagnosing apparatus 14 diagnoses the first cylinder 22a as "NO GOOD". Depending on the ratio R1 with respect to the first cylinder 22a, the diagnosing apparatus 14 displays "POOR TAPPET CLEARANCE" and "POOR COMPRESSION" as inspection terms and confirmation areas with respect to the first cylinder 22a. Inasmuch as the second and fourth cylinders 22b, 22d are not misfiring and do not suffer from a shortage of compression pressure, whereas the third cylinder 22c is misfiring but is not a cylinder suffering from a shortage of compression pressure, the second through fourth cylinders 22b through 22d are judged as "GOOD".

In FIG. 27, although the ratio R1 with respect to the first cylinder 22a is smaller than the threshold value TH2 (100%), the diagnostic trouble codes indicate that none of the first through fourth cylinders 22a through 22d are misfiring. Consequently, the diagnosing apparatus 14 judges all of the cylinders 22a through 22d as "GOOD".

In FIG. 28, the diagnostic trouble codes indicate that the first through third cylinders 22a through 22c are misfiring. Because the ratios R1 with respect to the first through third cylinders 22a through 22c are smaller than the threshold value TH2 (100%), the first through third cylinders 22a through 22c are judged as being cylinders that suffer from a shortage of compression pressure. Further, since the first through third cylinders 22a through 22c both are misfiring and are cylinders suffering from a shortage of compression pressure, the diagnosing apparatus 14 diagnoses the first through third cylinders 22a through 22c as "NO GOOD". Depending on the ratios R1, the diagnosing apparatus 14 displays "POOR COMPRESSION" as an inspection term and a confirmation area with respect to the first cylinder 22a, displays "LARGE TAPPET CLEARANCE DEVIATION" as an inspection term and a confirmation area with respect to the second cylinder 22b, and displays "SMALL TAPPET CLEARANCE DEVIATION" as an inspection term and a confirmation area with respect to the third cylinder 22c. Since the fourth cylinder 22d is not misfiring and does not suffer from a shortage of compression pressure, the fourth cylinder 22d is judged as "GOOD".

In FIG. 29, the diagnostic trouble codes indicate that the first cylinder 22a and the third cylinder 22c are misfiring. Because the ratios R1 with respect to the first cylinder 22a and the third cylinder 22c are smaller than the threshold value TH2 (100%), the first cylinder 22a and the third cylinder 22c are judged as being cylinders that suffer from a shortage of compression pressure. Further, since the first cylinder 22a and the third cylinder 22c both are misfiring and are cylinders suffering a shortage of compression pressure, the diagnosing apparatus 14 diagnoses the first cylinder 22a and the third cylinder 22c as "NO GOOD". Depending on the ratios R1, the diagnosing apparatus 14 displays "POOR COMPRESSION" as an inspection term and a confirmation area with respect to the first cylinder 22a, and displays "POOR TAPPET CLEARANCE" as an inspection term and a confirmation area with respect to the third cylinder 22c. Since the second cylinder 22b and the fourth cylinder 22d are not misfiring and are not cylinders that suffer from a shortage of compression pressure, the second cylinder 22b and the fourth cylinder 22d are judged as "GOOD".

In FIG. 30, the diagnostic trouble codes indicate that the fourth cylinder 22d is misfiring. The first through third cylinders 22a through 22c are not misfiring, although the first through third cylinders 22a through 22c are cylinders that suffer from a shortage of compression pressure. The fourth cylinder 22d is not a cylinder that suffers from a shortage of compression pressure, although the fourth cylinder 22d is a misfiring cylinder. Therefore, the diagnosing apparatus 14 judges that all of the cylinders 22a through 22d are "GOOD".

According to the present embodiment, as can be seen from the examples shown in FIGS. 25 through 30, a mechanical fault is judged to have occurred only when a misfiring cylinder is indicated by a diagnostic trouble code, and a compression pressure shortage cylinder, the ratio R1 of which is smaller than the threshold value TH2 (=100%), coincides with the misfiring cylinder, whereupon an inspection item and a confirmation area depending on the ratio R1 are indicated.

3. Advantages of the Present Embodiment

According to the present embodiment, as described above, if the ratio R1 with respect to a misfiring cylinder indicated by a diagnostic trouble code is smaller than 100%, or stated otherwise, if a cylinder 22 is identified which coincides with the misfiring cylinder indicated by the diagnostic trouble code, and a compression pressure shortage cylinder is determined to exist while the engine is being cranked, then the cylinder 22 is identified as suffering from a shortage of compression pressure and needs to be repaired. Consequently, it is possible to judge whether or not there is a shortage of compression pressure (mechanical fault) responsible for a misfire, without the need for disassembling the cylinders 22a through 22d. Thus, the efficiency with which the engine 16 is diagnosed for a fault can be increased.

According to the present embodiment, while the engine is being cranked in order to rotate the crankshaft 24 while explosion of fuel in the cylinders 22a through 22d is canceled, angular velocity variations $\Delta\omega$ are detected, thereby making it possible to judge the occurrence of an abnormal compression pressure in the cylinders 22a through 22d. Therefore, it is possible to judge whether or not there is a shortage of compression pressure (mechanical fault) responsible for a misfire, without the need for disassembling the cylinders 22a through 22d. Thus, the efficiency with which the engine 16 is diagnosed for a fault can be increased.

While the engine 16 is either operating normally or is being cranked, angular velocity variations $\Delta\omega$ in the power stroke are detected with respect to the cylinders 22a through 22d, so as to determine the presence of a compression pressure shortage cylinder based on the angular velocity variations $\Delta\omega$. Accordingly, a similar logic of the ECU 18 to that which is used for judging a misfire can be used as the logic for determining the presence of a compression pressure shortage cylinder. Consequently, an arrangement (including software such as judgment logic software) for detecting a compression pressure shortage cylinder can be simplified.

The present embodiment can be used not only when there are misfiring cylinders, but also to confirm proper operation of the engine 16 after the engine 16 has been assembled, such as when the vehicle is checked and serviced.

According to the present embodiment, while the engine is being cranked, individual average values AVEr and a total average value AVEt are compared with each other, and any one of the cylinders 22a through 22d having an individual average value AVEr that is smaller than the total average value AVEt is judged to be a compression pressure shortage cylinder. Therefore, the presence of a compression pressure shortage cylinder can be determined by relative comparison of the cylinders 22a through 22d. Even if a change in the voltage Vb of the battery 30, which is used for energizing the starter motor 28 that actuates the crankshaft 24, or changes in the ambient temperature, etc., affect the angular velocity variations $\Delta\omega$ to a certain extent, the angular velocity variations $\Delta\omega$ are less likely to affect the judgment concerning the compression pressure shortage cylinder.

According to the present embodiment, individual average values AVEr, which are smaller than the total average value AVEt, have degrees of difference thereof from the total average value AVEt displayed in a plurality of stages (FIG. 25). If an individual average value AVEr is smaller than the total average value AVEt, then the degree of difference of the individual average value AVEr from the total average value AVEt represents the magnitude of a shortage of compression pressure. The magnitude of the shortage of compression pressure depends on the cause thereof (e.g., leakage of compression pressure from the cylinders 22a through 22d, a clearance of the intake valve 40 or the exhaust valve 42). Therefore, the degree of difference of an individual average value AVEr from the total average value AVEt can be used as an indication for estimating the cause of the shortage of compression pressure. Therefore, when the degree of difference is displayed, it is possible for the operator to estimate the cause of the shortage of compression pressure. If the cause of the shortage of compression pressure is displayed along with the degree of difference, then diagnostic efficiency can be increased.

According to the present embodiment, while the engine is being cranked, angular velocity variations Δω start to be detected upon elapse of a predetermined time from initiation of the starter motor 28 that actuates the crankshaft 24, i.e., upon elapse of a predetermined time after the engine rotational speed NE exceeds the threshold value TH_NE. Since angular velocity variations are detected after cranking of the engine becomes stable, it is possible to reliably judge the presence of a compression pressure shortage cylinder.

According to the present embodiment, the voltage Vb of the battery 30, which energizes the starter motor 28 that actuates the crankshaft 24, is monitored. If the voltage Vb becomes lower than the threshold value TH_Vb, the process of judging a compression pressure shortage cylinder is canceled (S35: NO in FIG. 15). Since the judgment is avoided when cranking of the engine becomes unstable due to a drop in the voltage Vb of the battery 30, it is possible to avoid errors in determining the presence of a compression pressure shortage cylinder.

According to the present embodiment, if the temperature Tw of the engine coolant becomes lower than the threshold value THw, the process of judging a compression pressure shortage cylinder is canceled (S32: NO). If the threshold value THw is set to a value, which is unlikely to occur in a normal environment of usage, then the judgment concerning the compression pressure shortage cylinder is avoided in a peculiar environment of usage. Thus, it is possible to avoid errors in determining the presence of a compression pressure shortage cylinder.

B. Modifications

The present invention is not limited to the above embodiment, but may employ various additional or alternative arrangements based on the above disclosure of the present invention. For example, the present invention may employ the following arrangements.

In the above embodiment, the diagnosing apparatus is used to diagnose the engine 16 of the vehicle 12. However, the diagnosing apparatus 14 may be used in connection with other systems having engines, for example, mobile objects such as ships or the like. In the above embodiment, the diagnosing apparatus 14 communicates with the engine ECU 18 from an external location outside of the vehicle 12. However, the diagnosing apparatus 14 may be incorporated in the vehicle 12. Stated otherwise, the engine ECU 18 may include the functions of the diagnosing apparatus 14.

In the above embodiment, the engine 16 is an in-line four-cylinder engine. However, the layout and number of the cylinders 22a through 22d are not limited to those that make up parts of an in-line four-cylinder engine. The engine 16 may be a V-shaped six-cylinder engine. If the engine 16 is a V-shaped six-cylinder engine, the strokes, i.e., the intake, compression, power, and exhaust strokes, of the six cylinders occur successively in two revolutions) (720°) of the crankshaft 24. Consequently, crankshaft angles Ac, which are incremented by 120° (=720°/6), are assigned respectively to the power strokes of the cylinders.

In the above embodiment, the judgment of a misfire and the judgment of a compression pressure shortage are combined. However, from the standpoint of using angular velocity variations Δω of the crankshaft 24 that correspond to the power stroke, only one of such judgments, i.e., the judgment of a misfire or the judgment of a compression pressure shortage, may be used.

In the above embodiment, while the engine is being cranked, both the fuel supply system (the fuel injection valves 44, etc.) and the ignition system (the ignition plugs 46, etc.) are disabled. However, insofar as no fuel explosion occurs in the cylinders 22a through 22d, only the fuel supply system may be disabled.

In the above embodiment, the temperature Tw of the engine coolant is used to judge whether or not to cancel the process of determining a compression pressure shortage cylinder. However, instead of or in addition to the temperature Tw, the temperature To of an engine oil (not shown) may also be used.

In the above embodiment, angular velocity variations Δω in the power stroke are used to judge both misfiring and the occurrence of a compression pressure shortage. However, from the standpoint of combining the judgment of misfiring and the judgment of a compression pressure shortage, the present invention is not limited to using angular velocity variations Δω in the power stroke. For judging a compression pressure shortage, for example, angular velocity variations Δω in the compression stroke may be used.

In the above embodiment, a compression pressure shortage is determined by using individual average values AVEr and the total average value AVEt. However, from the standpoint of judging a compression pressure shortage, the present invention is not limited to using individual average values AVEr and the total average value AVEt. Only the individual average values AVEr may be used in order to judge the occurrence of a compression pressure shortage.

The invention claimed is:

1. A method of diagnosing an engine for a fault, which is monitored by a misfire monitor for judging a misfiring cylinder that suffers from a misfire while an engine having a plurality of cylinders is in operation, and storing a diagnostic trouble code representative of the misfiring cylinder, comprising:

detecting variations in angular velocity of a crankshaft in a power stroke of the engine for each of the cylinders while the engine is in normal operation, and determining one of the cylinders, which exhibits small variations in angular velocity, as the misfiring cylinder;

detecting variations in angular velocity of the crankshaft in a power stroke of the engine for each of the cylinders while the engine is being cranked to rotate the crankshaft while canceling fuel explosion in all of the cylinders simultaneously, and determining one of the cylinders, which exhibits small variations in angular velocity, as the compression pressure shortage cylinder; and identifying one of the cylinders, as a cylinder to be repaired, which coincides with the misfiring cylinder represented by the diagnostic trouble code and the compression pressure shortage cylinder that is determined while the engine is being cranked.

2. The method of diagnosing an engine for a fault according to claim 1, further comprising:

while the engine is being cranked, comparing individual average values, which represent average values of the individual variations of the cylinders, with a total average value, which represents an average value of the variations of the cylinders; and determining one of the cylinders, which exhibits a smaller individual average value than the total average value, as the compression pressure shortage cylinder.

3. The method of diagnosing an engine for a fault according to claim 2, further comprising:

displaying, in a plurality of stages, a degree of difference from the total average value, in connection with individual average values that are smaller than the total average value.

4. The method of diagnosing an engine for a fault according to claim 1, wherein the variations in angular velocity of the crankshaft while the engine is being cranked start being detected upon elapse of a predetermined time from start of a motor that actuates the crankshaft.

5. The method of diagnosing an engine for a fault according to claim 1, further comprising:
monitoring a voltage of a battery for energizing the motor that actuates the crankshaft; and
stopping determination of a compression pressure shortage cylinder if the voltage of the battery drops from a predetermined voltage.

6. A method of diagnosing an engine for a fault, which is monitored by a misfire monitor for detecting variations in angular velocity of a crankshaft of an engine having a plurality of cylinders, in a power stroke of the engine for each of the cylinders, and judging a misfiring cylinder that suffers from a misfire based on the detected variations, comprising:
cranking the engine to rotate the crankshaft while canceling fuel explosion in all of the cylinders simultaneously, detecting variations in angular velocity of the crankshaft in the power stroke for each of the cylinders while the engine is being cranked, and determining one of the cylinders, which exhibits variations in angular velocity that are equal to or smaller than a predetermined value, as a compression pressure shortage cylinder that suffers from a shortage of compression pressure.

7. The method of diagnosing an engine for a fault according to claim 6, further comprising:
while the engine is being cranked, comparing individual average values, which represent average values of the individual variations of the cylinders, with a total average value, which represents an average value of the variations of the cylinders; and
determining one of the cylinders, which exhibits a smaller individual average value than the total average value, as the compression pressure shortage cylinder.

8. The method of diagnosing an engine for a fault according to claim 7, further comprising:
displaying, in a plurality of stages, a degree of difference from the total average value, in connection with individual average values that are smaller than the total average value.

9. The method of diagnosing an engine for a fault according to claim 6, wherein the variations in angular velocity of the crankshaft while the engine is being cranked start being detected upon elapse of a predetermined time from start of a motor that actuates the crankshaft.

10. The method of diagnosing an engine for a fault according to claim 6, further comprising:
monitoring a voltage of a battery for energizing the motor that actuates the crankshaft; and
stopping determination of a compression pressure shortage cylinder if the voltage of the battery drops from a predetermined voltage.

11. An apparatus for diagnosing an engine for a fault, which is monitored by a misfire monitor for judging a misfiring cylinder that suffers from a misfire while an engine having a plurality of cylinders is in operation, and storing a diagnostic trouble code representative of the misfiring cylinder, wherein:
the apparatus detects variations in angular velocity of the crankshaft in a power stroke of the engine for each of the cylinders while the engine is in normal operation, and determines one of the cylinders, which exhibits small variations in angular velocity, as the misfiring cylinder;
the apparatus detects variations in angular velocity of the crankshaft for each of the cylinders while the engine is being cranked to rotate a crankshaft while canceling fuel explosion in all of the cylinders simultaneously, and determines one of the cylinders, which exhibits small variations in angular velocity, as the compression pressure shortage cylinder; and
the apparatus identifies one of the cylinders as a cylinder to be repaired, which coincides with the misfiring cylinder represented by the diagnostic trouble code and the compression pressure shortage cylinder that is determined while the engine is being cranked.

12. The apparatus for diagnosing an engine for a fault according to claim 11, wherein:
while the engine is being cranked, the apparatus compares individual average values, which represent average values of the individual variations of the cylinders, with a total average value, which represents an average value of the variations of the cylinders; and
the apparatus determines one of the cylinders, which exhibits a smaller individual average value than the total average value, as the compression pressure shortage cylinder.

13. The apparatus for diagnosing an engine for a fault according to claim 12, wherein:
the apparatus displays, in a plurality of stages, a degree of difference from the total average value, in connection with individual average values that are smaller than the total average value.

14. The apparatus for diagnosing an engine for a fault according to claim 9, wherein:
the apparatus starts detecting the variations in angular velocity of the crankshaft while the engine is being cranked upon elapse of a predetermined time from start of a motor that actuates the crankshaft.

15. The apparatus for diagnosing an engine for a fault according to claim 9, wherein:
the apparatus monitors a voltage of a battery for energizing the motor that actuates the crankshaft; and
the apparatus stops determination of a compression pressure shortage cylinder if the voltage of the battery drops from a predetermined voltage.

16. An apparatus for diagnosing an engine for a fault, which is monitored by a misfire monitor for detecting variations in angular velocity of a crankshaft of an engine having a plurality of cylinders, in a power stroke of the engine for each of the cylinders, and judging a misfiring cylinder that suffers from a misfire based on the detected variations, wherein
the apparatus cranks the engine to rotate the crankshaft while canceling fuel explosion in all of the cylinders simultaneously, detects variations in angular velocity of the crankshaft in the power stroke for each of the cylinders while the engine is being cranked, and determines one of the cylinders, which exhibits variations in angular velocity that are equal to or smaller than a predetermined value, as a compression pressure shortage cylinder that suffers from a shortage of compression pressure.

17. The apparatus for diagnosing an engine for a fault according to claim 11, wherein:
while the engine is being cranked, the apparatus compares individual average values, which represent average values of the individual variations of the cylinders, with a total average value, which represents an average value of the variations of the cylinders; and the apparatus determines one of the cylinders, which exhibits a smaller individual average value than the total average value, as the compression pressure shortage cylinder.

18. The apparatus for diagnosing an engine for a fault according to claim 17, wherein:

the apparatus displays, in a plurality of stages, a degree of difference from the total average value, in connection with individual average values that are smaller than the total average value.

19. The apparatus for diagnosing an engine for a fault according to claim 16, wherein:

the apparatus starts detecting the variations in angular velocity of the crankshaft while the engine is being cranked upon elapse of a predetermined time from start of a motor that actuates the crankshaft.

20. The apparatus for diagnosing an engine for a fault according to claim 16, wherein:

the apparatus monitors a voltage of a battery for energizing the motor that actuates the crankshaft; and the apparatus stops determination of a compression pressure shortage cylinder if the voltage of the battery drops from a predetermined voltage.

* * * * *